(12) United States Patent
Gunzelmann

(10) Patent No.: US 11,956,023 B2
(45) Date of Patent: Apr. 9, 2024

(54) ELECTRONIC DEVICES WITH HIGH FREQUENCY POLARIZATION OPTIMIZATION

(71) Applicant: Apple Inc., Cupertino, CA (US)

(72) Inventor: Bertram R Gunzelmann, Koenigsbrunn (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/827,329

(22) Filed: May 27, 2022

(65) Prior Publication Data

US 2023/0101322 A1 Mar. 30, 2023

Related U.S. Application Data

(60) Provisional application No. 63/247,176, filed on Sep. 22, 2021.

(51) Int. Cl.
*H04B 10/61* (2013.01)
*H01Q 9/06* (2006.01)

(52) U.S. Cl.
CPC ........ *H04B 10/6162* (2013.01); *H01Q 9/065* (2013.01); *H04B 2210/006* (2013.01)

(58) Field of Classification Search
None
See application file for complete search history.

(56) References Cited

U.S. PATENT DOCUMENTS

| 8,901,497 B2* | 12/2014 | Sartorius | G01N 21/3581 250/338.4 |
|---|---|---|---|
| 10,401,543 B1* | 9/2019 | Shi | G02B 5/22 |
| 2004/0184693 A1* | 9/2004 | Stegmuller | H04B 10/25752 385/2 |
| 2013/0177319 A1* | 7/2013 | Middleton | H01Q 3/2676 398/115 |

(Continued)

OTHER PUBLICATIONS

Rouvalis, "Optoelectronic detection of millimetre-wave signals with travelling-wave uni-travelling carrier photodiodes", 2011 OSA Jan. 31, 2011, vol. 19, No. 3, Optics Express pp. 2079-2084. (Year: 2011).*

(Continued)

*Primary Examiner* — Darren E Wolf
(74) *Attorney, Agent, or Firm* — Treyz Law Group, P.C.; Michael H. Lyons

(57) ABSTRACT

A first device may generate optical signals of different polarizations. Photodiodes may use the optical signals to transmit wireless signals at different polarizations and at a frequency greater than 100 GHz using the optical signals. A second device may receive the wireless signals and may convert the wireless signals into optical signals. A Stokes vector receiver on the second device may generate Stokes vectors based on the optical signals. Control circuitry on the second device may use the Stokes vectors generated for a series of training data in the wireless signals to generate a rotation matrix that characterizes polarization rotation between the first and second devices. The control circuitry may multiply wireless data in subsequently received wire- (Continued)

less signals by the rotation matrix to mitigate the polarization rotation and other transmission impairments while using minimal resources.

20 Claims, 10 Drawing Sheets

(56) References Cited

U.S. PATENT DOCUMENTS

| | | | |
|---|---|---|---|
| 2014/0042584 A1* | 2/2014 | Achouche | H01L 31/101 257/463 |
| 2018/0278336 A1 | 9/2018 | Huang et al. | |
| 2020/0076511 A1* | 3/2020 | Lim | H04B 10/6162 |
| 2021/0015225 A1* | 1/2021 | Moon | A45C 3/001 |
| 2022/0303017 A1* | 9/2022 | Kim | H04B 10/0797 |

OTHER PUBLICATIONS

Peng Bai et al., "Broadband THz to NIR up-converter for photon-type THz imaging," Nature Communications, 2019, pp. 1-9, vol. 10, No. 3513, Springer Nature, Berlin, DE.

Emilien Peytavit et al., "Highly efficient terahertz detection by optical mixing in a GaAs photoconductor," Applied Physics Letters, Nov. 12, 2013, vol. 103, No. 201107, AIP Publishing LLC, Melville, NY, United States.

E. Rouvalis et al., "High-speed photodiodes for InP-based photonic integrated circuits," Optics Express, Apr. 9, 2012, pp. 9172-9177, vol. 20, No. 8, Optica Publishing Group, Washington, DC, United States.

Peng Bai et al., "Infrared single photon detector based on optical up-converter at 1550 nm," Scientific Reports, Nov. 10, 2017, pp. 1-12, vol. 7, No. 15341, Nature Portfolio, London, GB.

Toshimasa Umezawa et al., "Millimeter-Wave Integrated Photoreceivers for High Data Rate Photonic Wireless Communication," IEEE Journal of Selected Topics in Quantum Electronics, Mar./Apr. 2018, vol. 24, No. 2, IEEE, New York, NY, United States.

T. Harter et al., "Silicon-plasmonic integrated circuits for terahertz signal generation and coherent detection," Nature Photonics, Sep. 24, 2018, pp. 625-633, vol. 12, Nature Publishing Group, New York, NY, United States.

Ahmad W. Mohammad et al., "Optically Pumped Mixing in Photonically Integrated Uni-Travelling Carrier Photodiode", 43rd International Conference on Infrared, Millimeter, and Terahertz Waves, Sep. 9, 2018, IEEE, New York, NY.

Efthymios Rouvalis et al., "Optically Pumped Mixing at 100 GHz with Travelling-Wave Uni-Travelling Carrier Photodiodes", CLEO: 2011—Laser Science to Photonic Applications, May 1, 2011, IEEE, New York, NY.

Di Chi et al., 160-GB/s Stokes Vector Direct Detection for Short Reach Optical Communication, Optical Society of America, Downloaded on Oct. 12, 2020, pp. 1-3, OFC Postdeadline 2014.

Stephan Jaeckel et al., A Geometric Polarization Rotation Model for the 3-D Spatial Channel Model, IEEE Transactions on Antennas and Propagation, Dec. 12, 2012, pp. 5966-5977, vol. 60, No. 12, IEEE.

J.P. Gordon et al., PMD fundamentals: Polarization mode dispersion in optical fibers, Apr. 25, 2000, pp. 4541-4550, vol. 97, No. 9, PNAS.

Kanno Atsushi et al., Optical and radio seamless MIMO transmission with 20-Gbaud QPSK, 2012 38th European Conference and Exhibition on Optical Communications, 2012, pp. 1-3, Optical Society of America.

\* cited by examiner

ELECTRONIC DEVICES WITH HIGH FREQUENCY POLARIZATION OPTIMIZATION

This application claims the benefit of U.S. Provisional Patent Application No. 63/247,176, filed Sep. 22, 2021, which is hereby incorporated by reference herein in its entirety.

FIELD

This disclosure relates generally to electronic devices and, more particularly, to electronic devices with wireless circuitry.

BACKGROUND

Electronic devices are often provided with wireless capabilities. An electronic device with wireless capabilities has wireless circuitry that includes one or more antennas. The wireless circuitry is used to perform communications using radio-frequency signals conveyed by the antennas.

As software applications on electronic devices become more data-intensive over time, demand has grown for electronic devices that support wireless communications at higher data rates. However, the maximum data rate supported by electronic devices is limited by the frequency of the radio-frequency signals. In addition, if care is not taken, impairments such as misalignment between an electronic device and external equipment can limit communication efficiency in scenarios where signals are conveyed between the electronic device and the external equipment using multiple electromagnetic polarizations.

SUMMARY

A wireless communication system may include a central optical processor and an access point. The central optical processor may generate first optical signals at a first frequency and having a first polarization, second optical signals at the first frequency and having a second polarization, and third optical signals at a second frequency that is different from the first frequency. An optical combiner may combine the first, second, and third optical signals onto an optical fiber. The optical fiber may illuminate a first photodiode in the access point using the first optical signal and the third optical signal. The optical fiber may illuminate a second photodiode in the access point using the second optical signal and the third optical signal.

The first photodiode may transmit first wireless signals having the first polarization over a first antenna radiating element based on the first and third optical signals. The second photodiode may transmit second wireless signals having the second polarization over a second antenna radiating element based on the second and third optical signals. The first and second wireless signals may be transmitted at a frequency greater than or equal to 100 GHz. An electronic device may receive the first and second wireless signals. The first optical signal may be modulated to include a series of training data. The training data may be used by the electronic device to mitigate polarization rotations and other transmission impairments.

The electronic device may include a first antenna radiating element that receives the first wireless signals and a second antenna radiating element that receives the second wireless signals. The electronic device may include a first photodiode that converts the first wireless signals to fourth optical signals using an optical local oscillator and a second photodiode that converts the second wireless signals to fifth optical signals using the optical local oscillator. The electronic device may include a Stokes vector receiver that generates Stokes vectors based on the fourth and fifth optical signals. One or more processors on the electronic device may use the Stokes vectors generated for the series of training data to generate a rotation matrix that characterizes the polarization rotation between the electronic device and the wireless communications system. The one or more processors may multiply the wireless data in subsequently received wireless signals by the rotation matrix to mitigate the polarization rotation and other transmission impairments while using minimal resources.

An aspect of the disclosure provides an electronic device. The electronic device can include a first antenna radiating element configured to receive a first wireless signal of a first polarization at a frequency greater than or equal to 100 GHz. The electronic device can include a second antenna radiating element configured to receive a second wireless signal of a second polarization that is different from the first polarization. The electronic device can include a first photodiode coupled to the first antenna radiating element and configured to convert the first wireless signal into a first optical signal. The electronic device can include a second photodiode coupled to the second antenna radiating element and configured to convert the second wireless signal into a second optical signal. The electronic device can include a Stokes vector receiver coupled to the first photodiode over a first optical path and coupled to the second photodiode over a second optical path.

An aspect of the disclosure provides a method of performing wireless communications using an electronic device. The method can include with one or more antennas, receiving first wireless signals of a first polarization and second wireless signals of a second polarization that is different from the first polarization. The method can include with a first photodiode, converting the first wireless signals into first optical signals. The method can include with a second photodiode, converting the second wireless signals into second optical signals. The method can include with a receiver, generating Stokes vectors based on the first optical signals and the second optical signals. The method can include with one or more processors, generating a rotation matrix based on the Stokes vectors. The method can include with the one or more processors, applying the rotation matrix to wireless data in subsequent wireless signals received using the one or more antennas.

An aspect of the disclosure provides a wireless communication system. The wireless communication system can include a first photodiode. The wireless communication system can include a first antenna coupled to the first photodiode. The wireless communication system can include a second photodiode. The wireless communication system can include a second antenna coupled to the second photodiode. The wireless communication system can include a first light source configured to generate a first optical signal at a first frequency and having a first polarization and configured to generate a second optical signal at the first frequency and having a second polarization orthogonal to the first polarization. The wireless communication system can include a second light source configured to generate a third optical signal at a second frequency that is different from the first frequency. The wireless communication system can include an optical combiner configured to combine the first optical signal, the second optical signal, and the third optical signal onto an optical path, the optical path being configured to illuminate the first photodiode using the first optical signal and the third optical signal and being configured to illuminate the second photodiode using the second optical signal and the third optical signal, the first photodiode being configured to transmit first wireless signals having the first polarization over the first antenna based on the first optical signal and the third optical signal, and the second photodiode being configured to transmit second wireless signals having the second polarization over the second antenna based on the second optical signal and the third optical signal.

DETAILED DESCRIPTION

Figure 1:
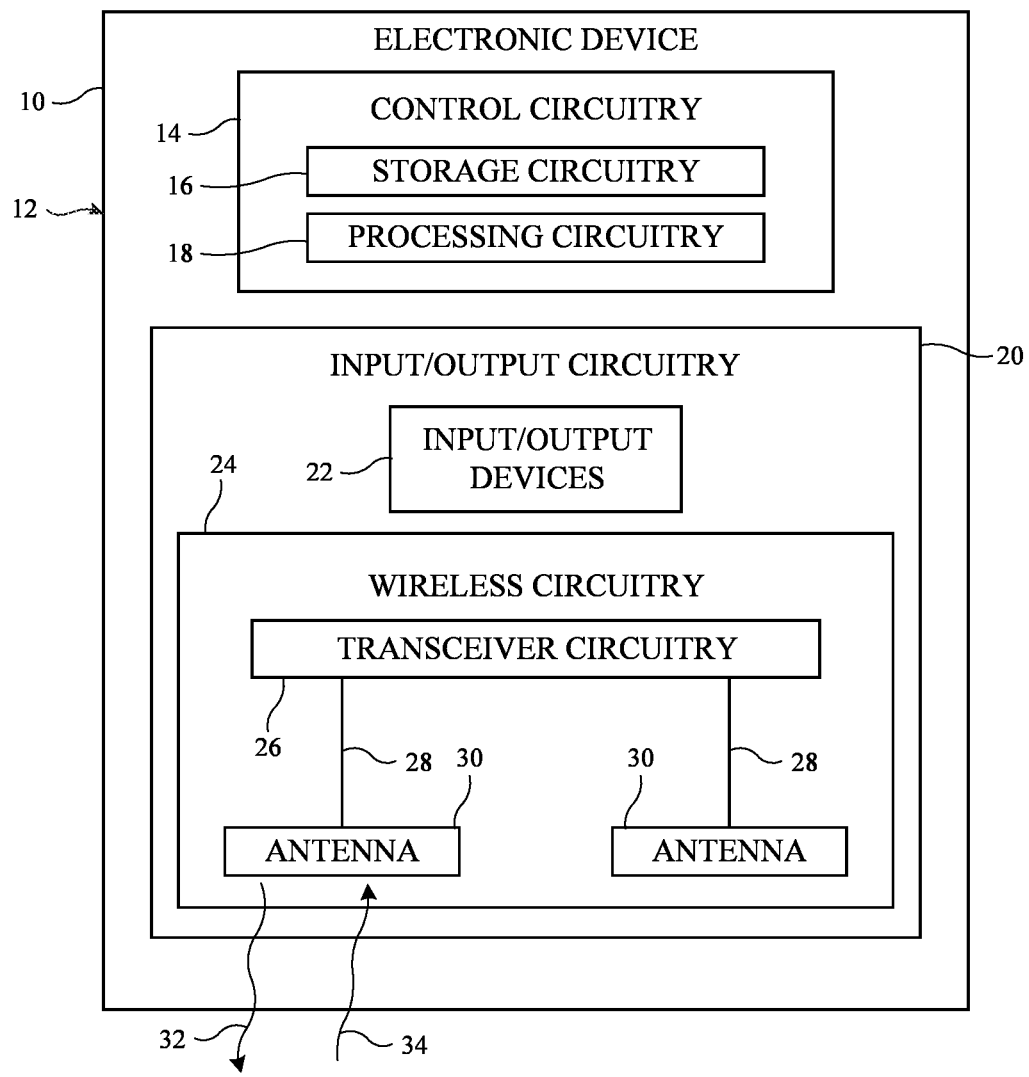
FIG. 1 is a block diagram of an illustrative electronic device having wireless circuitry with at least one antenna that conveys wireless signals at frequencies greater than about 100 GHz in accordance with some embodiments.

Electronic device 10 of FIG. 1 (sometimes referred to herein as electro-optical device 10) may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses, goggles, or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in the functional block diagram of FIG. 1, device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, parts or all of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more processors, microprocessors, microcontrollers, digital signal processors, host processors, baseband processor integrated circuits, application specific integrated circuits, central processing units (CPUs), graphics processing units (GPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols.

Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, Sixth Generation (6G) protocols, sub-THz protocols, THz protocols, etc.), antenna diversity protocols, satellite navigation system protocols (e.g., global positioning system (GPS) protocols, global navigation satellite system (GLONASS) protocols, etc.), antenna-based spatial ranging protocols, optical communications protocols, or any other desired communications protocols. Each communications protocol may be associated with a corresponding radio access technology (RAT) that specifies the physical connection methodology used in implementing the protocol.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), temperature sensors, etc. In some configurations, keyboards, headphones, displays, pointing devices such as trackpads, mice, and joysticks, and other input-output devices may be coupled to device 10 using wired or wireless connections (e.g., some of input-output devices 22 may be peripherals that are coupled to a main processing unit or other portion of device 10 via a wired or wireless link).

Input-output circuitry 20 may include wireless circuitry 24 to support wireless communications. Wireless circuitry 24 (sometimes referred to herein as wireless communications circuitry 24) may include one or more antennas 30. Wireless circuitry 24 may also include transceiver circuitry 26. Transceiver circuitry 26 may include transmitter circuitry, receiver circuitry, modulator circuitry, demodulator circuitry (e.g., one or more modems), radio-frequency circuitry, one or more radios, intermediate frequency circuitry, optical transmitter circuitry, optical receiver circuitry, optical light sources, other optical components, baseband circuitry (e.g., one or more baseband processors), amplifier circuitry, clocking circuitry such as one or more local oscillators and/or phase-locked loops, memory, one or more registers, filter circuitry, switching circuitry, analog-to-digital converter (ADC) circuitry, digital-to-analog converter (DAC) circuitry, radio-frequency transmission lines, optical fibers, and/or any other circuitry for transmitting and/or receiving wireless signals using antennas 30. The components of transceiver circuitry 26 may be implemented on one integrated circuit, chip, system-on-chip (SOC), die, printed circuit board, substrate, or package, or the components of transceiver circuitry 26 may be distributed across two or more integrated circuits, chips, SOCs, printed circuit boards, substrates, and/or packages.

The example of FIG. 1 is merely illustrative. While control circuitry 14 is shown separately from wireless circuitry 24 in the example of FIG. 1 for the sake of clarity, wireless circuitry 24 may include processing circuitry (e.g., one or more processors) that forms a part of processing circuitry 18 and/or storage circuitry that forms a part of storage circuitry 16 of control circuitry 14 (e.g., portions of control circuitry 14 may be implemented on wireless circuitry 24). As an example, control circuitry 14 may include baseband circuitry (e.g., one or more baseband processors), digital control circuitry, analog control circuitry, and/or other control circuitry that forms part of wireless circuitry 24. The baseband circuitry may, for example, access a communication protocol stack on control circuitry 14 (e.g., storage circuitry 20) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum layer.

Transceiver circuitry 26 may be coupled to each antenna 30 in wireless circuitry 24 over a respective signal path 28. Each signal path 28 may include one or more radio-frequency transmission lines, waveguides, optical fibers, and/or any other desired lines/paths for conveying wireless signals between transceiver circuitry 26 and antenna 30. Antennas 30 may be formed using any desired antenna structures for conveying wireless signals. For example, antennas 30 may include antennas with resonating elements that are formed from dipole antenna structures, planar dipole antenna structures (e.g., bowtie antenna structures), slot antenna structures, loop antenna structures, patch antenna structures, inverted-F antenna structures, planar inverted-F antenna structures, helical antenna structures, monopole antennas, dipoles, hybrids of these designs, etc. Filter circuitry, switching circuitry, impedance matching circuitry, and/or other antenna tuning components may be adjusted to adjust the frequency response and wireless performance of antennas 30 over time.

If desired, two or more antennas 30 may be integrated into a phased antenna array (sometimes referred to herein as a phased array antenna) in which each of the antennas conveys wireless signals with a respective phase and magnitude that is adjusted over time so the wireless signals constructively and destructively interfere to produce (form) a signal beam in a given pointing direction. The term "convey wireless signals" as used herein means the transmission and/or reception of the wireless signals (e.g., for performing unidirectional and/or bidirectional wireless communications with external wireless communications equipment). Antennas 30 may transmit the wireless signals by radiating the signals into free space (or to free space through intervening device structures such as a dielectric cover layer). Antennas 30 may additionally or alternatively receive the wireless signals from free space (e.g., through intervening devices structures such as a dielectric cover layer). The transmission and reception of wireless signals by antennas 30 each involve the excitation or resonance of antenna currents on an antenna resonating (radiating) element in the antenna by the wireless signals within the frequency band(s) of operation of the antenna.

Transceiver circuitry 26 may use antenna(s) 30 to transmit and/or receive wireless signals that convey wireless communications data between device 10 and external wireless communications equipment (e.g., one or more other devices such as device 10, a wireless access point or base station, etc.). The wireless communications data may be conveyed bidirectionally or unidirectionally. The wireless communications data may, for example, include data that has been encoded into corresponding data packets such as wireless data associated with a telephone call, streaming media content, internet browsing, wireless data associated with software applications running on device 10, email messages, etc.

Additionally or alternatively, wireless circuitry 24 may use antenna(s) 30 to perform wireless sensing operations. The sensing operations may allow device 10 to detect (e.g., sense or identify) the presence, location, orientation, and/or velocity (motion) of objects external to device 10. Control circuitry 14 may use the detected presence, location, orientation, and/or velocity of the external objects to perform any desired device operations. As examples, control circuitry 14 may use the detected presence, location, orientation, and/or velocity of the external objects to identify a corresponding user input for one or more software applications running on device 10 such as a gesture input performed by the user's hand(s) or other body parts or performed by an external stylus, gaming controller, head-mounted device, or other peripheral devices or accessories, to determine when one or more antennas 30 needs to be disabled or provided with a reduced maximum transmit power level (e.g., for satisfying regulatory limits on radio-frequency exposure), to determine how to steer (form) a radio-frequency signal beam produced by antennas 30 for wireless circuitry 24 (e.g., in scenarios where antennas 30 include a phased array of antennas 30), to map or model the environment around device 10 (e.g., to produce a software model of the room where device 10 is located for use by an augmented reality application, gaming application, map application, home design application, engineering application, etc.), to detect the presence of obstacles in the vicinity of (e.g., around) device 10 or in the direction of motion of the user of device 10, etc.

Wireless circuitry 24 may transmit and/or receive wireless signals within corresponding frequency bands of the electromagnetic spectrum (sometimes referred to herein as communications bands or simply as "bands"). The frequency bands handled by communications circuitry 26 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), other centimeter or millimeter wave frequency bands between 10-100 GHz, near-field communications frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

Over time, software applications on electronic devices such as device 10 have become more and more data intensive. Wireless circuitry on the electronic devices therefore needs to support data transfer at higher and higher data rates. In general, the data rates supported by the wireless circuitry are proportional to the frequency of the wireless signals conveyed by the wireless circuitry (e.g., higher frequencies can support higher data rates than lower frequencies). Wireless circuitry 24 may convey centimeter and millimeter wave signals to support relatively high data rates (e.g., because centimeter and millimeter wave signals are at relatively high frequencies between around 10 GHz and 100 GHz). However, the data rates supported by centimeter and millimeter wave signals may still be insufficient to meet all the data transfer needs of device 10. To support even higher data rates such as data rates up to 5-10 Gbps or higher, wireless circuitry 24 may convey wireless signals at frequencies greater than 100 GHz.

As shown in FIG. 1, wireless circuitry 24 may transmit wireless signals 32 and may receive wireless signals 34 at frequencies greater than around 100 GHz. Wireless signals 32 and 34 may sometimes be referred to herein as tremendously high frequency (THF) signals 32 and 34, sub-THz signals 32 and 34, THz signals 32 and 34, or sub-millimeter wave signals 32 and 34. THF signals 32 and 34 may be at sub-THz or THz frequencies such as frequencies between 100 GHz and 1 THz, between 100 GHz and 10 THz, between 100 GHz and 2 THz, between 200 GHz and 1 THz, between 300 GHz and 1 THz, between 300 GHz and 2 THz, between 300 GHz and 10 THz, between 100 GHz and 800 GHz, between 200 GHz and 1.5 THz, etc. (e.g., within a sub-THz, THz, THF, or sub-millimeter frequency band such as a 6G frequency band). The high data rates supported by these frequencies may be leveraged by device 10 to perform cellular telephone voice and/or data communications (e.g., while supporting spatial multiplexing to provide further data bandwidth), to perform spatial ranging operations such as radar operations to detect the presence, location, and/or velocity of objects external to device 10, to perform automotive sensing (e.g., with enhanced security), to perform health/body monitoring on a user of device 10 or another person, to perform gas or chemical detection, to form a high data rate wireless connection between device 10 and another device or peripheral device (e.g., to form a high data rate connection between a display driver on device 10 and a display that displays ultra-high resolution video), to form a remote radio head (e.g., a flexible high data rate connection), to form a THF chip-to-chip connection within device 10 that supports high data rates (e.g., where one antenna 30 on a first chip in device 10 transmits THF signals 32 to another antenna 30 on a second chip in device 10), and/or to perform any other desired high data rate operations.

Space is at a premium within electronic devices such as device 10. In some scenarios, different antennas 30 are used to transmit THF signals 32 than are used to receive THF signals 34. However, handling transmission of THF signals 32 and reception of THF signals 34 using different antennas 30 can consume an excessive amount of space and other resources within device 10 because two antennas 30 and signal paths 28 would be required to handle both transmission and reception. To minimize space and resource consumption within device 10, the same antenna 30 and signal path 28 may be used to both transmit THF signals 32 and to receive THF signals 34. If desired, multiple antennas 30 in wireless circuitry 24 may transmit THF signals 32 and may receive THF signals 34. The antennas may be integrated into a phased antenna array that transmits THF signals 32 and that receives THF signals 34 within a corresponding signal beam oriented in a selected beam pointing direction.

It can be challenging to incorporate components into wireless circuitry 24 that support wireless communications at these high frequencies. If desired, transceiver circuitry 26 and signal paths 28 may include optical components that convey optical signals to support the transmission of THF signals 32 and the reception of THF signals 34 in a space and resource-efficient manner. The optical signals may be used in transmitting THF signals 32 at THF frequencies and in receiving THF signals 34 at THF frequencies.

Figure 2:
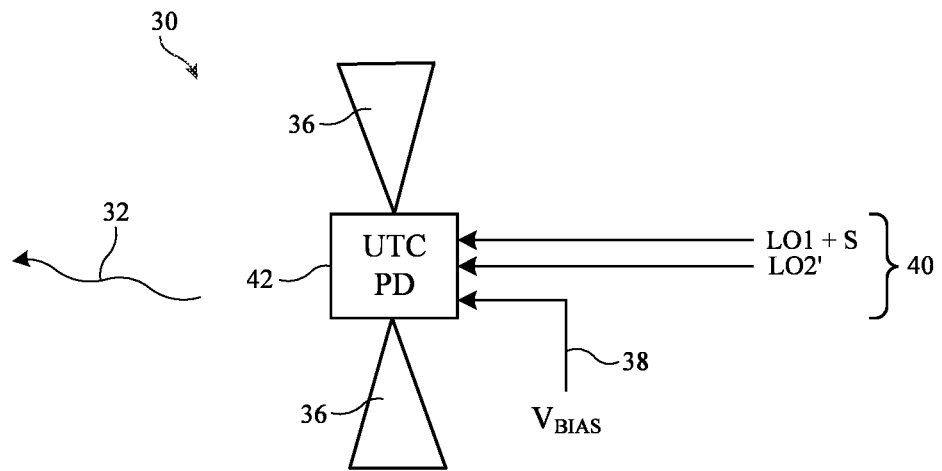
FIG. 2 is a top view of an illustrative antenna that transmits wireless signals at frequencies greater than about 100 GHz based on optical local oscillator (LO) signals in accordance with some embodiments.

FIG. 2 is a diagram of an illustrative antenna 30 that may be used to both transmit THF signals 32 and to receive THF signals 34 using optical signals. Antenna 30 may include one or more antenna radiating (resonating) elements such as radiating (resonating) element arms 36. In the example of FIG. 2, antenna 30 is a planar dipole antenna (sometimes referred to as a "bowtie" antenna) having two opposing radiating element arms 36 (e.g., bowtie arms or dipole arms). This is merely illustrative and, in general, antenna 30 may be any type of antenna having any desired antenna radiating element architecture.

As shown in FIG. 2, antenna 30 includes a photodiode (PD) 42 coupled between radiating element arms 36. Electronic devices that include antennas 30 with photodiodes 42 such as device 10 may sometimes also be referred to as electro-optical devices (e.g., electro-optical device 10). Photodiode 42 may be a programmable photodiode. An example in which photodiode 42 is a programmable uni-travelling-carrier photodiode (UTC PD) is described herein as an example. Photodiode 42 may therefore sometimes be referred to herein as UTC PD 42 or programmable UTC PD 42. This is merely illustrative and, in general, photodiode 42 may include any desired type of adjustable/programmable photodiode or component that converts electromagnetic energy at optical frequencies to current at THF frequencies on radiating element arms 36 and/or vice versa. Each radiating element arm 36 may, for example, have a first edge at UTC PD 42 and a second edge opposite the first edge that is wider than the first edge (e.g., in implementations where antenna 30 is a bowtie antenna). Other radiating elements may be used if desired.

UTC PD 42 may have a bias terminal 38 that receives one or more control signals $V_{BIAS}$. Control signals $V_{BIAS}$ may include bias voltages provided at one or more voltage levels and/or other control signals for controlling the operation of UTC PD 42 such as impedance adjustment control signals for adjusting the output impedance of UTC PD 42. Control circuitry 14 (FIG. 1) may provide (e.g., apply, supply, assert, etc.) control signals $V_{BIAS}$ at different settings (e.g., values, magnitudes, etc.) to dynamically control (e.g., program or adjust) the operation of UTC PD 42 over time. For example, control signals $V_{BIAS}$ may be used to control whether antenna 30 transmits THF signals 32 or receives THF signals 34. When control signals $V_{BIAS}$ include a bias voltage asserted at a first level or magnitude, antenna 30 may be configured to transmit THF signals 32. When control signals $V_{BIAS}$ include a bias voltage asserted at a second level or magnitude, antenna 30 may be configured to receive THF signals 34. In the example of FIG. 2, control signals $V_{BIAS}$ include the bias voltage asserted at the first level to configure antenna 30 to transmit THF signals 32. If desired, control signals $V_{BIAS}$ may also be adjusted to control the waveform of the THF signals (e.g., as a squaring function that preserves the modulation of incident optical signals, a linear function, etc.), to perform gain control on the signals conveyed by antenna 30, and/or to adjust the output impedance of UTC PD 42.

As shown in FIG. 2, UTC PD 42 may be optically coupled to optical path 40. Optical path 40 may include one or more optical fibers or waveguides. UTC PD 42 may receive optical signals from transceiver circuitry 26 (FIG. 1) over optical path 40. The optical signals may include a first optical local oscillator (LO) signal LO1 and a second optical local oscillator signal LO2. Optical local oscillator signals LO1 and LO2 may be generated by light sources in transceiver circuitry 26 (FIG. 1). Optical local oscillator signals LO1 and LO2 may be at optical wavelengths (e.g., between 400 nm and 700 nm), ultra-violet wavelengths (e.g., near-ultra-violet or extreme ultraviolet wavelengths), and/or infrared wavelengths (e.g., near-infrared wavelengths, mid-infrared wavelengths, or far-infrared wavelengths). Optical local oscillator signal LO2 may be offset in wavelength from optical local oscillator signal LO1 by a wavelength offset X. Wavelength offset X may be equal to the wavelength of the THF signals conveyed by antenna 30 (e.g., between 100 GHz and 1 THz (1000 GHz), between 100 GHz and 2 THz, between 300 GHz and 800 GHz, between 300 GHz and 1 THz, between 300 and 400 GHz, etc.).

During signal transmission, wireless data (e.g., wireless data packets, symbols, frames, etc.) may be modulated onto optical local oscillator signal LO2 to produce modulated optical local oscillator signal LO2'. If desired, optical local oscillator signal LO1 may be provided with an optical phase shift S. Optical path 40 may illuminate UTC PD 42 with optical local oscillator signal LO1 (plus the optical phase shift S when applied) and modulated optical local oscillator signal LO2'. If desired, lenses or other optical components may be interposed between optical path 40 and UTC PD 42 to help focus the optical local oscillator signals onto UTC PD 42.

UTC PD 42 may convert optical local oscillator signal LO1 and modulated local oscillator signal LO2' (e.g., beats between the two optical local oscillator signals) into antenna currents that run along the perimeter of radiating element arms 36. The frequency of the antenna currents is equal to the frequency difference between local oscillator signal LO1 and modulated local oscillator signal LO2'. The antenna currents may radiate (transmit) THF signals 32 into free space. Control signal $V_{BIAS}$ may control UTC PD 42 to convert the optical local oscillator signals into antenna currents on radiating element arms 36 while preserving the modulation and thus the wireless data on modulated local oscillator signal LO2' (e.g., by applying a squaring function to the signals). THF signals 32 will thereby carry the modulated wireless data for reception and demodulation by external wireless communications equipment.

Figure 3:
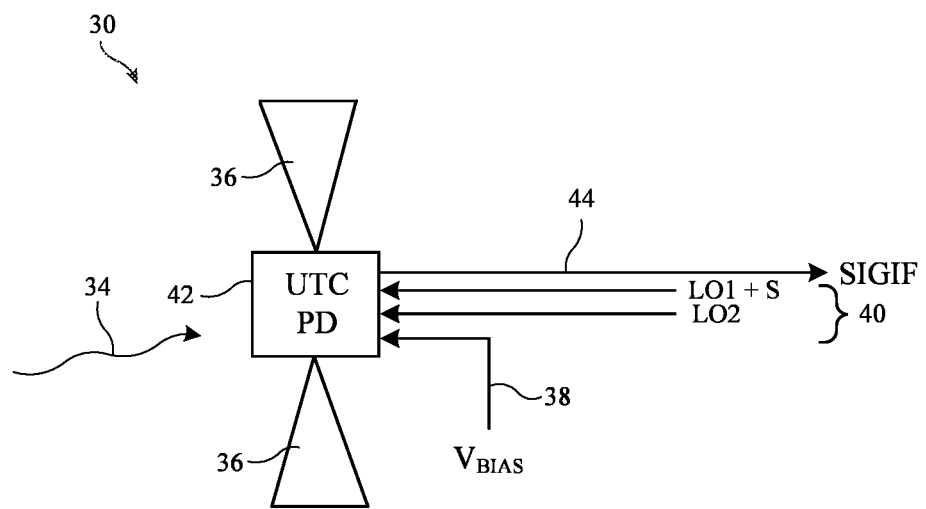
FIG. 3 is a top view showing how an illustrative antenna of the type shown in FIG. 2 may convert received wireless signals at frequencies greater than about 100 GHz into intermediate frequency signals based on optical LO signals in accordance with some embodiments.

FIG. 3 is a diagram showing how antenna 30 may receive THF signals 34 (e.g., after changing the setting of control signals $V_{BIAS}$ into a reception state from the transmission state of FIG. 2). As shown in FIG. 3, THF signals 34 may be incident upon antenna radiating element arms 36. The incident THF signals 34 may produce antenna currents that flow around the perimeter of radiating element arms 36. UTC PD 42 may use optical local oscillator signal LO1 (plus the optical phase shift S when applied), optical local oscillator signal LO2 (e.g., without modulation), and control signals $V_{BIAS}$ (e.g., a bias voltage asserted at the second level) to convert the received THF signals 34 into intermediate frequency signals SIGIF that are output onto intermediate frequency signal path 44.

The frequency of intermediate frequency signals SIGIF may be equal to the frequency of THF signals 34 minus the difference between the frequency of optical local oscillator signal LO1 and the frequency of optical local oscillator signal LO2. As an example, intermediate frequency signals SIGIF may be at lower frequencies than THF signals 32 and 34 such as centimeter or millimeter wave frequencies between 10 GHz and 100 GHz, between 30 GHz and 80 GHz, around 60 GHz, etc. If desired, transceiver circuitry 26 (FIG. 1) may change the frequency of optical local oscillator signal LO1 and/or optical local oscillator signal LO2 when switching from transmission to reception or vice versa. UTC PD 42 may preserve the data modulation of THF signals 34 in intermediate signals SIGIF. A receiver in transceiver circuitry 26 (FIG. 1) may demodulate intermediate frequency signals SIGIF (e.g., after further downconversion) to recover the wireless data from THF signals 34. In another example, wireless circuitry 24 may convert intermediate frequency signals SIGIF to the optical domain before recovering the wireless data. In yet another example, intermediate frequency signal path 44 may be omitted and UTC PD 42 may convert THF signals 34 into the optical domain for subsequent demodulation and data recovery (e.g., in a sideband of the optical signal).

Figure 4:
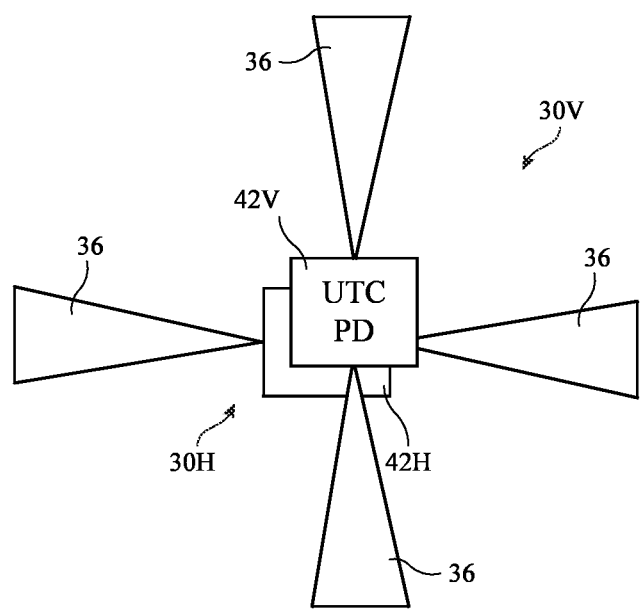
FIG. 4 is a top view showing how multiple antennas of the type shown in FIGS. 2 and 3 may be stacked to cover multiple polarizations in accordance with some embodiments.

The antenna 30 of FIGS. 2 and 3 may support transmission of THF signals 32 and reception of THF signals 34 with a given polarization (e.g., a linear polarization such as a vertical polarization). If desired, wireless circuitry 24 (FIG. 1) may include multiple antennas 30 for covering different polarizations. FIG. 4 is a diagram showing one example of how wireless circuitry 24 may include multiple antennas 30 for covering different polarizations.

As shown in FIG. 4, the wireless circuitry may include a first antenna 30 such as antenna 30V for covering a first polarization (e.g., a first linear polarization such as a vertical polarization) and may include a second antenna 30 such as antenna 30H for covering a second polarization different from or orthogonal to the first polarization (e.g., a second linear polarization such as a horizontal polarization). Antenna 30V may have a UTC PD 42 such as UTC PD 42V coupled between a corresponding pair of radiating element arms 36. Antenna 30H may have a UTC PD 42 such as UTC PD 42H coupled between a corresponding pair of radiating element arms 36 oriented non-parallel (e.g., orthogonal) to the radiating element arms 36 in antenna 30V. This may allow antennas 30V and 30H to transmit THF signals 32 with respective (orthogonal) polarizations and may allow antennas 30V and 30H to receive THF signals 32 with respective (orthogonal) polarizations.

To minimize space within device 10, antenna 30V may be vertically stacked over or under antenna 30H (e.g., where UTC PD 42V partially or completely overlaps UTC PD 42H). In this example, antennas 30V and 30H may both be formed on the same substrate such as a rigid or flexible printed circuit board. The substrate may include multiple stacked dielectric layers (e.g., layers of ceramic, epoxy, flexible printed circuit board material, rigid printed circuit board material, etc.). The radiating element arms 36 in antenna 30V may be formed on a separate layer of the substrate than the radiating element arms 36 in antenna 30H or the radiating element arms 36 in antenna 30V may be formed on the same layer of the substrate as the radiating element arms 36 in antenna 30H. UTC PD 42V may be formed on the same layer of the substrate as UTC PD 42H or UTC PD 42V may be formed on a separate layer of the substrate than UTC PD 42H. UTC PD 42V may be formed on the same layer of the substrate as the radiating element arms 36 in antenna 30V or may be formed on a separate layer of the substrate as the radiating element arms 36 in antenna 30V. UTC PD 42H may be formed on the same layer of the substrate as the radiating element arms 36 in antenna 30H or may be formed on a separate layer of the substrate as the radiating element arms 36 in antenna 30H.

Figure 5:
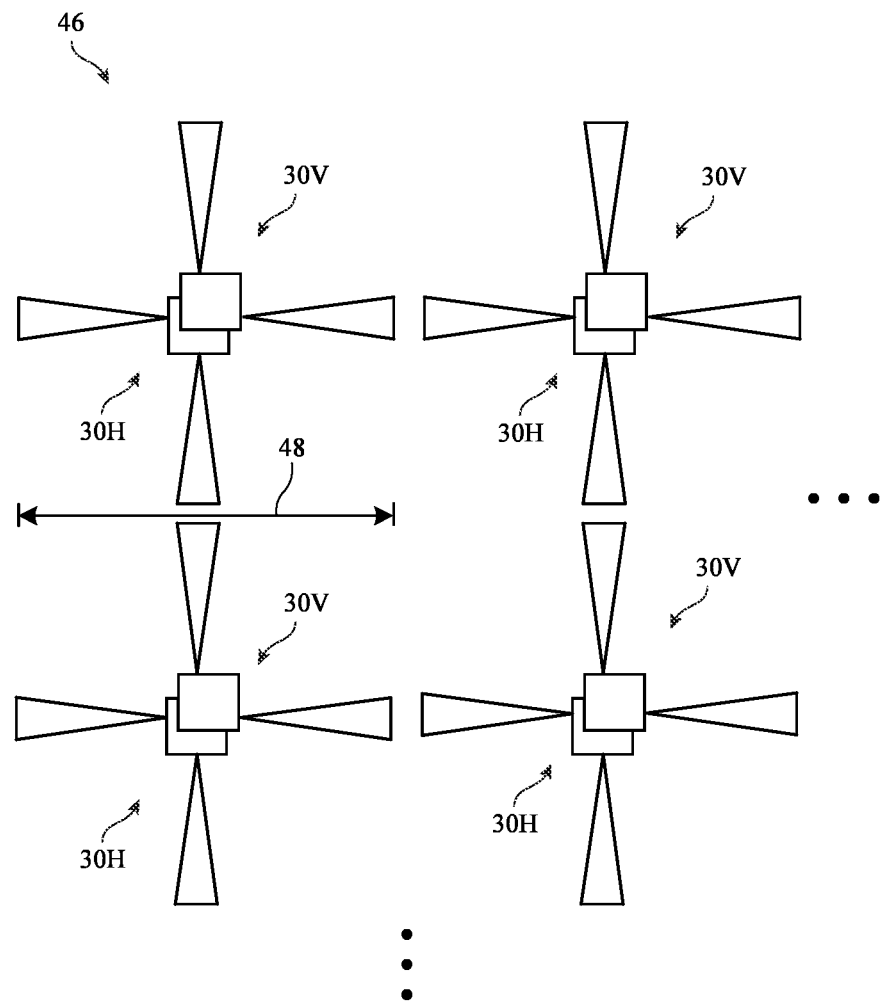
FIG. 5 is a top view showing how stacked antennas of the type shown in FIG. 4 may be integrated into a phased antenna array for conveying wireless signals at frequencies greater than about 100 GHz within a corresponding signal beam.

If desired, antennas 30 or antennas 30H and 30V of FIG. 4 may be integrated within a phased antenna array. FIG. 5 is a diagram showing one example of how antennas 30H and 30V may be integrated within a phased antenna array. As shown in FIG. 5, device 10 may include a phased antenna array 46 of stacked antennas 30H and 30V arranged in a rectangular grid of rows and columns. Each of the antennas in phased antenna array 46 may be formed on the same substrate. This is merely illustrative. In general, phased antenna array 46 (sometimes referred to as a phased array antenna) may include any desired number of antennas 30V and 30H (or non-stacked antennas 30) arranged in any desired pattern. Each of the antennas in phased antenna array 46 may be provided with a respective optical phase shift S (FIGS. 2 and 3) that configures the antennas to collectively transmit THF signals 32 and/or receive THF signals 34 that sum to form a signal beam of THF signals in a desired beam pointing direction. The beam pointing direction may be selected to point the signal beam towards external communications equipment, towards a desired external object, away from an external object, etc.

Phased antenna array 46 may occupy relatively little space within device 10. For example, each antenna 30V/30H may have a length 48 (e.g., as measured from the end of one radiating element arm to the opposing end of the opposite radiating element arm). Length 48 may be approximately equal to one-half the wavelength of THF signals 32 and 34. For example, length 48 may be as small as 0.5 mm or less. Each UTC-PD 42 in phased antenna array 46 may occupy a lateral area of 100 square microns or less. This may allow phased antenna array 46 to occupy very little area within device 10, thereby allowing the phased antenna array to be integrated within different portions of device 10 while still allowing other space for device components. The examples of FIGS. 2-5 are merely illustrative and, in general, each antenna may have any desired antenna radiating element architecture.

Figure 6:
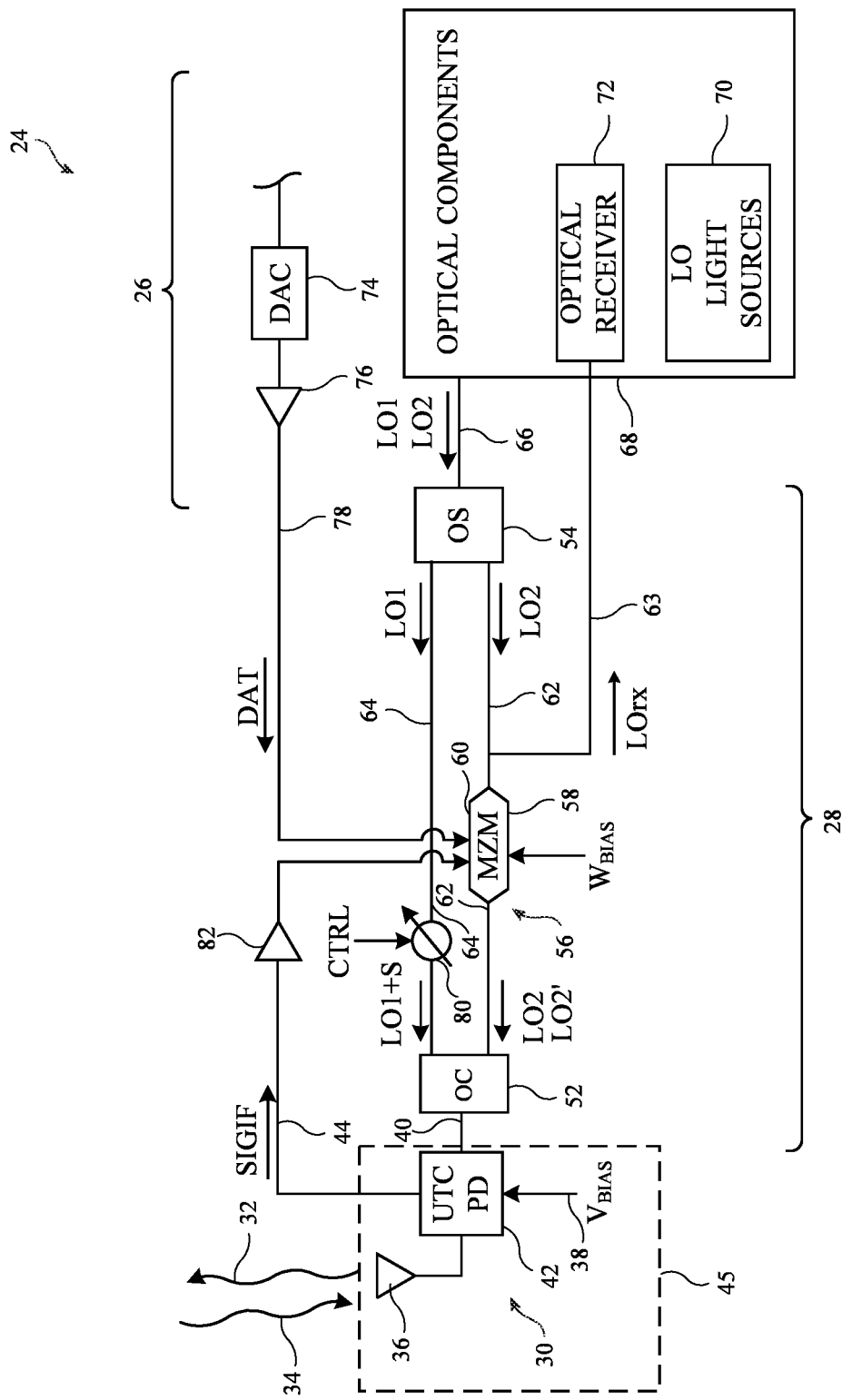
FIG. 6 is a circuit diagram of illustrative wireless circuitry having an antenna that transmits wireless signals at frequencies greater than about 100 GHz and that receives wireless signals at frequencies greater than about 100 GHz for conversion to intermediate frequencies and then to the optical domain in accordance with some embodiments.

FIG. 6 is a circuit diagram showing how a given antenna 30 and signal path 28 (FIG. 1) may be used to both transmit THF signals 32 and receive THF signals 34 based on optical local oscillator signals. In the example of FIG. 6, UTC PD 42 converts received THF signals 34 into intermediate frequency signals SIGIF that are then converted to the optical domain for recovering the wireless data from the received THF signals.

As shown in FIG. 6, wireless circuitry 24 may include transceiver circuitry 26 coupled to antenna 30 over signal path 28 (e.g., an optical signal path sometimes referred to herein as optical signal path 28). UTC PD 42 may be coupled between the radiating element arm(s) 36 of antenna 30 and signal path 28. Transceiver circuitry 26 may include optical components 68, amplifier circuitry such as power amplifier 76, and digital-to-analog converter (DAC) 74. Optical components 68 may include an optical receiver such as optical receiver 72 and optical local oscillator (LO) light sources (emitters) 70. LO light sources 70 may include two or more light sources such as laser light sources, laser diodes, optical phase locked loops, or other optical emitters that emit light (e.g., optical local oscillator signals LO1 and LO2) at respective wavelengths. If desired, LO light sources 70 may include a single light source and may include optical components for splitting the light emitted by the light source into different wavelengths. Signal path 28 may be coupled to optical components 68 over optical path 66. Optical path 66 may include one or more optical fibers and/or waveguides.

Signal path 28 may include an optical splitter such as optical splitter (OS) 54, optical paths such as optical path 64 and optical path 62, an optical combiner such as optical combiner (OC) 52, and optical path 40. Optical path 62 may be an optical fiber or waveguide. Optical path 64 may be an optical fiber or waveguide. Optical splitter 54 may have a first (e.g., input) port coupled to optical path 66, a second (e.g., output) port coupled to optical path 62, and a third (e.g., output) port coupled to optical path 64. Optical path 64 may couple optical splitter 54 to a first (e.g., input) port of optical combiner 52. Optical path 62 may couple optical splitter 54 to a second (e.g., input) port of optical combiner 52. Optical combiner 52 may have a third (e.g., output) port coupled to optical path 40.

An optical phase shifter such as optical phase shifter 80 may be (optically) interposed on or along optical path 64. An optical modulator such as optical modulator 56 may be (optically) interposed on or along optical path 62. Optical modulator 56 may be, for example, a Mach-Zehnder modulator (MZM) and may therefore sometimes be referred to herein as MZM 56. MZM 56 includes a first optical arm (branch) 60 and a second optical arm (branch) 58 interposed in parallel along optical path 62. Propagating optical local oscillator signal LO2 along arms 60 and 58 of MZM 56 may, in the presence of a voltage signal applied to one or both arms, allow different optical phase shifts to be imparted on each arm before recombining the signal at the output of the MZM (e.g., where optical phase modulations produced on the arms are converted to intensity modulations at the output of MZM 56). When the voltage applied to MZM 56 includes wireless data, MZM 56 may modulate the wireless data onto optical local oscillator signal LO2. If desired, the phase shifting performed at MZM 56 may be used to perform beam forming/steering in addition to or instead of optical phase shifter 80. MZM 56 may receive one or more bias voltages $W_{BIAS}$ (sometimes referred to herein as bias signals $W_{BIAS}$) applied to one or both of arms 58 and 60. Control circuitry 14 (FIG. 1) may provide bias voltage $W_{BIAS}$ with different magnitudes to place MZM 56 into different operating modes (e.g., operating modes that suppress optical carrier signals, operating modes that do not suppress optical carrier signals, etc.).

Intermediate frequency signal path 44 may couple UTC PD 42 to MZM 56 (e.g., arm 60). An amplifier such as low noise amplifier 82 may be interposed on intermediate frequency signal path 44. Intermediate frequency signal path 44 may be used to pass intermediate frequency signals SIGIF from UTC PD 42 to MZM 56. DAC 74 may have an input coupled to up-conversion circuitry, modulator circuitry, and/or baseband circuitry in a transmitter of transceiver circuitry 26. DAC 74 may receive digital data to transmit over antenna 30 and may convert the digital data to the analog domain (e.g., as data DAT). DAC 74 may have an output coupled to transmit data path 78. Transmit data path 78 may couple DAC 74 to MZM 56 (e.g., arm 60). Each of the components along signal path 28 may allow the same antenna 30 to both transmit THF signals 32 and receive THF signals 34 (e.g., using the same components along signal path 28), thereby minimizing space and resource consumption within device 10.

LO light sources 70 may produce (emit) optical local oscillator signals LO1 and LO2 (e.g., at different wavelengths that are separated by the wavelength of THF signals 32/34). Optical components 68 may include lenses, waveguides, optical couplers, optical fibers, and/or other optical components that direct the emitted optical local oscillator signals LO1 and LO2 towards optical splitter 54 via optical path 66. Optical splitter 54 may split the optical signals on optical path 66 (e.g., by wavelength) to output optical local oscillator signal LO1 onto optical path 64 while outputting optical local oscillator signal LO2 onto optical path 62.

Control circuitry 14 (FIG. 1) may provide phase control signals CTRL to optical phase shifter 80. Phase control signals CTRL may control optical phase shifter 80 to apply optical phase shift S to the optical local oscillator signal LO1 on optical path 64. Phase shift S may be selected to steer a signal beam of THF signals 32/34 in a desired pointing direction. Optical phase shifter 80 may pass the phase-shifted optical local oscillator signal LO1 (denoted as LO1+S) to optical combiner 52. Signal beam steering is performed in the optical domain (e.g., using optical phase shifter 80) rather than in the THF domain because there are no satisfactory phase shifting circuit components that operate at frequencies as high as the frequencies of THF signals 32 and 34. Optical combiner 52 may receive optical local oscillator signal LO2 over optical path 62. Optical combiner 52 may combine optical local oscillator signals LO1 and LO2 onto optical path 40, which directs the optical local oscillator signals onto UTC PD 42 for use during signal transmission or reception.

During transmission of THF signals 32, DAC 74 may receive digital wireless data (e.g., data packets, frames, symbols, etc.) for transmission over THF signals 32. DAC 74 may convert the digital wireless data to the analog domain and may output (transmit) the data onto transmit data path 78 as data DAT (e.g., for transmission via antenna 30). Power amplifier 76 may amplify data DAT. Transmit data path 78 may pass data DAT to MZM 56 (e.g., arm 60). MZM 56 may modulate data DAT onto optical local oscillator signal LO2 to produce modulated optical local oscillator signal LO2' (e.g., an optical local oscillator signal at the frequency/wavelength of optical local oscillator signal LO2 but that is modulated to include the data identified by data DAT). Optical combiner 52 may combine optical local oscillator signal LO1 with modulated optical local oscillator signal LO2' at optical path 40.

Optical path 40 may illuminate UTC PD 42 with (using) optical local oscillator signal LO1 (e.g., with the phase shift S applied by optical phase shifter 80) and modulated optical local oscillator signal LO2'. Control circuitry 14 (FIG. 1) may apply a control signal $V_{BIAS}$ to UTC PD 42 that configures antenna 30 for the transmission of THF signals 32. UTC PD 42 may convert optical local oscillator signal LO1 and modulated optical local oscillator signal LO2' into antenna currents on radiating element arm(s) 36 at the frequency of THF signals 32 (e.g., while programmed for transmission using control signal $V_{BIAS}$). The antenna currents on radiating element arm(s) 36 may radiate THF signals 32. The frequency of THF signals 32 is given by the difference in frequency between optical local oscillator signal LO1 and modulated optical local oscillator signal LO2'. Control signals $V_{BIAS}$ may control UTC PD 42 to preserve the modulation from modulated optical local oscillator signal LO2' in the radiated THF signals 32. External equipment that receives THF signals 32 will thereby be able to extract data DAT from the THF signals 32 transmitted by antenna 30.

During reception of THF signals 34, MZM 56 does not modulate any data onto optical local oscillator signal LO2. Optical path 40 therefore illuminates UTC PD 42 with optical local oscillator signal LO1 (e.g., with phase shift S) and optical local oscillator signal LO2. Control circuitry 14 (FIG. 1) may apply a control signal $V_{BIAS}$ (e.g., a bias voltage) to UTC PD 42 that configures antenna 30 for the receipt of THF signals 32. UTC PD 42 may use optical local oscillator signals LO1 and LO2 to convert the received THF signals 34 into intermediate frequency signals SIGIF output onto intermediate frequency signal path 44 (e.g., while programmed for reception using bias voltage $V_{BIAS}$). Intermediate frequency signals SIGIF may include the modulated data from the received THF signals 34. Low noise amplifier 82 may amplify intermediate frequency signals SIGIF, which are then provided to MZM 56 (e.g., arm 60). MZM 56 may convert intermediate frequency signals SIGIF to the optical domain as optical signals LOrx (e.g., by modulating the data in intermediate frequency signals SIGIF onto one of the optical local oscillator signals) and may pass the optical signals to optical receiver 72 in optical components 68, as shown by arrow 63 (e.g., via optical paths 62 and 66 or other optical paths). Control circuitry 14 (FIG. 1) may use optical receiver 72 to convert optical signals LOrx to other formats and to recover (demodulate) the data carried by THF signals 34 from the optical signals. In this way, the same antenna 30 and signal path 28 may be used for both the transmission and reception of THF signals while also performing beam steering operations.

The example of FIG. 6 in which intermediate frequency signals SIGIF are converted to the optical domain is merely illustrative. If desired, transceiver circuitry 26 may receive and demodulate intermediate frequency signals SIGIF without first passing the signals to the optical domain. For example, transceiver circuitry 26 may include an analog-to-digital converter (ADC), intermediate frequency signal path 44 may be coupled to an input of the ADC rather than to MZM 56, and the ADC may convert intermediate frequency signals SIGIF to the digital domain. As another example, intermediate frequency signal path 44 may be omitted and control signals $V_{BIAS}$ may control UTC PD 42 to directly sample THF signals 34 with optical local oscillator signals LO1 and LO2 to the optical domain. As an example, UTC PD 42 may use the received THF signals 34 and control signals $V_{BIAS}$ to produce an optical signal on optical path 40. The optical signal may have an optical carrier with sidebands that are separated from the optical carrier by a fixed frequency offset (e.g., 30-100 GHz, 60 GHz, 50-70 GHz, 10-100 GHz, etc.). The sidebands may be used to carry the modulated data from the received THF signals 34. Signal path 28 may direct (propagate) the optical signal produced by UTC PD 42 to optical receiver 72 in optical components 68 (e.g., via optical paths 40, 64, 62, 66, 63, and/or other optical paths). Control circuitry 14 (FIG. 1) may use optical receiver 72 to convert the optical signal to other formats and to recover (demodulate) the data carried by THF signals 34 from the optical signal (e.g., from the sidebands of the optical signal).

Figure 7:
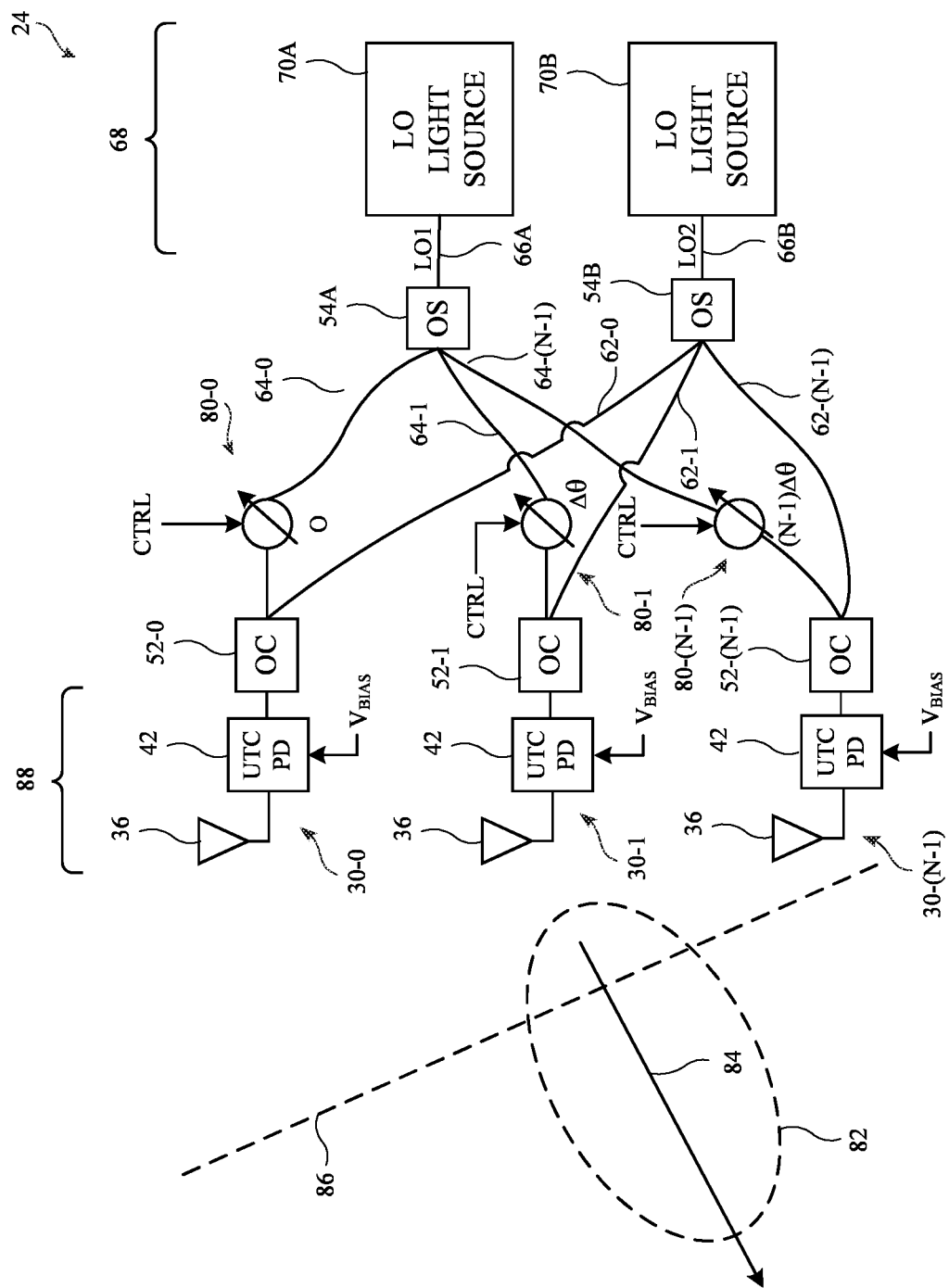
FIG. 7 is a circuit diagram of an illustrative phased antenna array that conveys wireless signals at frequencies greater than about 100 GHz within a corresponding signal beam in accordance with some embodiments.

FIG. 7 is a circuit diagram showing one example of how multiple antennas 30 may be integrated into a phased antenna array 88 that conveys THF signals over a corresponding signal beam. In the example of FIG. 7, MZMs 56, intermediate frequency signal paths 44, data paths 78, and optical receiver 72 of FIG. 6 have been omitted for the sake of clarity. Each of the antennas in phased antenna array 88 may alternatively sample received THF signals directly into the optical domain or may pass intermediate frequency signals SIGIF to ADCs in transceiver circuitry 26.

As shown in FIG. 7, phased antenna array 88 includes N antennas 30 such as a first antenna 30-0, a second antenna 30-1, and an Nth antenna 30-(N−1). Each of the antennas 30 in phased antenna array 88 may be coupled to optical components 68 via a respective optical signal path (e.g., optical signal path 28 of FIG. 6). Each of the N signal paths may include a respective optical combiner 52 coupled to the UTC PD 42 of the corresponding antenna 30 (e.g., the UTC PD 42 in antenna 30-0 may be coupled to optical combiner 52-0, the UTC PD 42 in antenna 30-1 may be coupled to optical combiner 52-1, the UTC PD 42 in antenna 30-(N−1) may be coupled to optical combiner 52-(N−1), etc.). Each of the N signal paths may also include a respective optical path 62 and a respective optical path 64 coupled to the corresponding optical combiner 52 (e.g., optical paths 64-0 and 62-0 may be coupled to optical combiner 52-0, optical paths 64-1 and 62-1 may be coupled to optical combiner 52-1, optical paths 64-(N−1) and 62-(N−1) may be coupled to optical combiner 52-(N−1), etc.).

Optical components 68 may include LO light sources 70 such as a first LO light source 70A and a second LO light source 70B. The optical signal paths for each of the antennas 30 in phased antenna array 88 may share one or more optical splitters 54 such as a first optical splitter 54A and a second optical splitter 54B. LO light source 70A may generate (e.g., produce, emit, transmit, etc.) first optical local oscillator signal LO1 and may provide first optical local oscillator signal LO1 to optical splitter 54A via optical path 66A. Optical splitter 54A may distribute first optical local oscillator signal LO1 to each of the UTC PDs 42 in phased antenna array 88 over optical paths 64 (e.g., optical paths 64-0, 64-1, 64-(N−1), etc.). Similarly, LO light source 70B may generate (e.g., produce, emit, transmit, etc.) second optical local oscillator signal LO2 and may provide second optical local oscillator signal LO2 to optical splitter 54B via optical path 66B. Optical splitter 54B may distribute second optical local oscillator signal LO2 to each of the UTC PDs 42 in phased antenna array 88 over optical paths 62 (e.g., optical paths 62-0, 62-1, 62-(N−1), etc.).

A respective optical phase shifter 80 may be interposed along (on) each optical path 64 (e.g., a first optical phase shifter 80-0 may be interposed along optical path 64-0, a second optical phase shifter 80-1 may be interposed along optical path 64-1, an Nth optical phase shifter 80-(N−1) may be interposed along optical path 64-(N−1), etc.). Each optical phase shifter 80 may receive a control signal CTRL that controls the phase S provided to optical local oscillator signal LO1 by that optical phase shifter (e.g., first optical phase shifter 80-0 may impart an optical phase shift of zero degrees/radians to the optical local oscillator signal LO1 provided to antenna 30-0, second optical phase shifter 80-1 may impart an optical phase shift of $\Delta\phi$ to the optical local oscillator signal LO1 provided to antenna 30-1, Nth optical phase shifter 80-(N−1) may impart an optical phase shift of (N−1)$\Delta\phi$ to the optical local oscillator signal LO1 provided to antenna 30-(N−1), etc.). By adjusting the phase S imparted by each of the N optical phase shifters 80, control circuitry 14 (FIG. 1) may control each of the antennas 30 in phased antenna array 88 to transmit THF signals 32 and/or to receive THF signals 34 within a formed signal beam 83. Signal beam 83 may be oriented in a particular beam pointing direction (angle) 84 (e.g., the direction of peak gain of signal beam 83). The THF signals conveyed by phased antenna array 88 may have wavefronts 86 that are orthogonal to beam pointing direction 84. Control circuitry 14 may adjust beam pointing direction 84 over time to point towards external communications equipment or an external object or to point away from external objects, as examples.

Phased antenna array 88 may be operable in an active mode in which the array transmits and/or receives THF signals using optical local oscillator signals LO1 and LO2 (e.g., using phase shifts provided to each antenna element to steer signal beam 83). If desired, phased antenna array 88 may also be operable in a passive mode in which the array does not transmit or receive THF signals. Instead, in the passive mode, phased antenna array 88 may be configured to form a passive reflector that reflects THF signals or other electromagnetic waves incident upon device 10. In the passive mode, the UTC PDs 42 in phased antenna array 88 are not illuminated by optical local oscillator signals LO1 and LO2 and transceiver circuitry 26 performs no modulation/demodulation, mixing, filtering, detection, modulation, and/or amplifying of the incident THF signals.

Antenna radiating element arm(s) 36 and UTC PD 42 (FIG. 6) may sometimes be referred to herein collectively as access point (AP) 45 (e.g., a THF access point). In some implementations, a single access point 45 is used to communicate with a single external device (e.g., another device such as device 10, a wireless base station or access point, or other wireless (THF) communications equipment). If desired, transceiver 26 may use multiple access points distributed across one or more locations to concurrently communicate with one or more external devices over one or more streams of wireless signals (e.g., THF signals 32 and 34 of FIG. 1).

Figure 8:
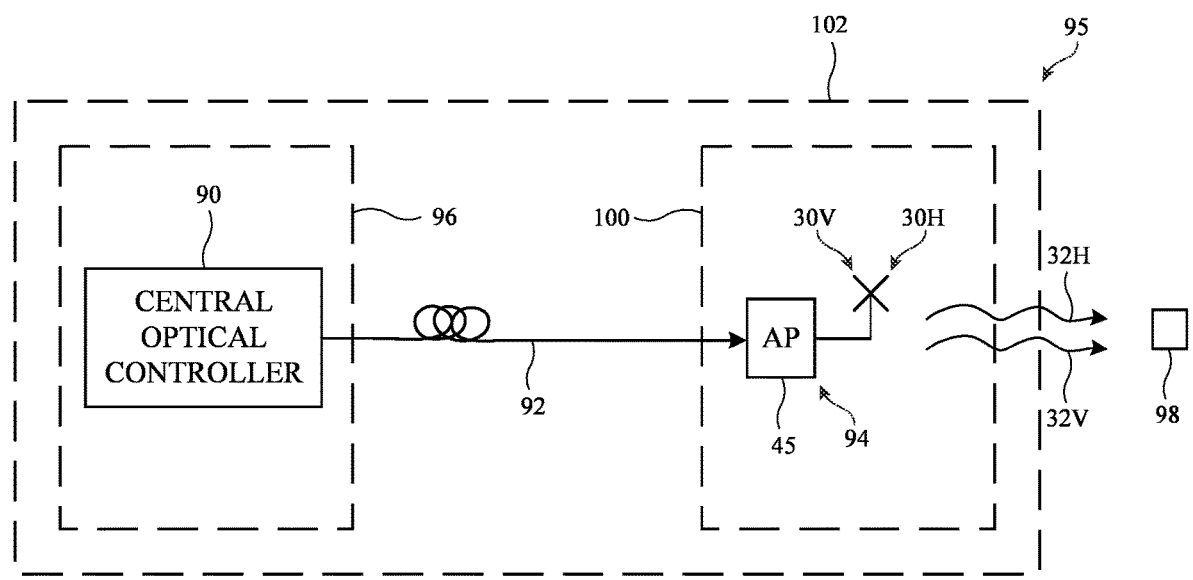
FIG. 8 is a diagram showing how an illustrative central optical controller may provide optical signals to an access point for conveying multiple polarizations of wireless signals at frequencies greater than about 100 GHz based on the optical signals in accordance with some embodiments.

To maximize the overall data rate and/or flexibility of THF communications performed using device 10, wireless circuitry 24 may convey THF signals using multiple electromagnetic polarizations such as a first polarization and a second polarization that is different from (e.g., orthogonal to) the first polarization. Each polarization may, for example, be used to concurrently convey respective streams of wireless data. FIG. 8 is a diagram showing one example of how device 10 may convey THF signals using multiple electromagnetic polarizations.

As shown in FIG. 8, wireless communications system 95 (sometimes referred to herein as THF system 95, wireless system 95, communications system 95, or simply as system 95) may include one or more access points such as access point 45. Access point 45 may include at least one dual-polarization antenna 94. Dual-polarization antenna 94 may, for example, include overlapping antennas 30V and 30H having orthogonal radiating element arms (e.g., bow tie antennas as shown in FIG. 4). Antennas 30V and 3011 may be fed using respective UTC PDs 42 in access point 45, for example. Antenna 3011 may transmit THF signals with a first polarization such as THF signals 32H whereas antenna 30V transmits THF signals with a second polarization orthogonal to the first polarization such as THF signals 32V.

In the example of FIG. 8, THF signals 32H have a first linear polarization (e.g., a horizontal polarization) whereas THF signals 32V have a second linear polarization orthogonal to the first linear polarization (e.g., a vertical polarization). This is merely illustrative. In general, THF signals 32H and 32V may have any desired polarizations. THF signals 32H and 32V need not be linearly polarized and, if desired, other polarizations such as circular or elliptical polarizations may be used. While THF signals 3211 and antenna 30H are sometimes referred to herein as "horizontally polarized" or are otherwise denoted using the letter H, the angle of the corresponding electric field may be oriented in any desired direction. Similarly, while THF signals 32V and antenna 30V are sometimes referred to herein as "vertically polarized" or are otherwise denoted using the letter V, the angle of the corresponding electric field may be oriented in any desired direction (e.g., orthogonal to the direction of the "horizontally polarized" signals).

Wireless communications system 95 may also include a centralized optical controller such as central optical controller 90. Central optical controller 90 may sometimes also be referred to herein as central office 90, central chip 90, optical controller 90, or optical processor 90. Central optical controller 90 may include control circuitry such as control circuitry 14 of FIG. 1. The components of wireless circuitry 24 of FIG. 6 may be distributed between access points 45 and central optical controller 90 of FIG. 8. For example, central optical controller 90 may include transceiver 26 and signal path 28 of FIG. 6. Central optical controller 90 may be communicably coupled to access point 45 over an optical signal path such as optical path 92. Optical path 92 may include one or more optical fibers and/or waveguides.

Central optical controller 90 may be co-located with access point 45 or may be disposed at a location separated from access point 45. For example, central optical controller 90, optical path 92, and access point 45 may all be enclosed within an electronic device housing such as housing 102 (e.g., a housing such as housing 12 of FIG. 1). When configured in this way, central optical controller 90, optical path 92, and access point 45 may all form components of a corresponding device 10. As another example, central optical controller 90 may be enclosed within a first housing such as housing 96 (e.g., a housing such as housing 12 of FIG. 1) whereas access point 45 is enclosed within a second housing 100 (e.g., a housing such as housing 12 of FIG. 1). When configured in this way, central optical controller 90 may be located within a first device 10 whereas access point 45 is located within a second device 10.

In other words, wireless communications system 95 may be located within a single device 10 or may be distributed across multiple devices 10. In examples where the components of wireless communications system 95 are located within a single device 10, access point 45 may be separated from or co-located with central optical controller 90 within the device and optical path 92 may have a length on the order of inches, centimeters, or meters. In examples where the components of wireless communications system 95 are located within different devices 10, central optical controller 90 may be located in the same room or a different room of the same building or a different building as access point 45 or may be located in a different geographic region from access point 45 (e.g., optical path 92 may be as long as a few km, dozens of km, hundreds of km, or thousands of km in length). If desired, optical path 92 may include multiple optical fibers that are coupled together in series using optical couplers, optical boosters/amplifiers, optical relays, etc.

Central optical controller 90 may generate optical signals (e.g., optical local oscillator signals) for access point 45. Central optical controller 90 may transmit the optical signals over optical path 92. Access point 45 may transmit wireless signals 3211 and 32V using the optical signals. Access point 45 may transmit THF signals 32H and 32V to one or more external devices such as external device 98. The UTC PD 42 coupled to antenna 30V may transmit THF signals 32V using a pair of optical signals received over optical path 92 (e.g., where the frequency of THF signals 32V is given by the difference in frequency between the pair of optical signals). Similarly, the UTC PD 42 coupled to antenna 30H may transmit THF signals 32H using a pair of optical signals received over optical path 92 (e.g., where the frequency of THF signals 32H is given by the difference in frequency between the pair of optical signals). External device 98 may be another device such as device 10, a wireless base station or access point, or other wireless (THF) communications equipment, for example. While FIG. 8 illustrates the transmission of THF signals 32H and 32V, wireless communications system 95 may additionally or alternatively receive THF signals 34 (FIG. 1) from external device 98 in one or more (e.g., orthogonal) polarizations.

The fiber and radio resources in wireless communications system 95 should be as tightly coupled as possible. Coupling the fiber and radio parameters (e.g., bandwidth, modulation order, polarization, symbol rate, etc.) as much as possible may minimize the resources required at access point 45, where only minimal processing of the optical signals from central optical controller 90 towards THF frequencies would be required. In a simplest case, an optical polarization plane may be frequency shifted to a linearly polarized THF signal. This may avoid any demodulation and remodulation within access point 45. As a consequence, the optical fiber channel and the THF (radio) transmission channel may be viewed as a combined overall channel.

Conveying THF signals with multiple polarizations can raise many challenges to efficient wireless communications between external device 98 and wireless communications system 95. For example, external device 98 may be able to coherently demodulate the separate streams of wireless data in THF signals 32H and 32V when the antennas on external device 98 for conveying THF signals in each polarization are aligned with the antennas on wireless communications system 95 that transmitted THF signals 32H and 32V, when external device 98 does not move or rotate with respect to wireless communications system 95, and when wireless communications system 95 does not move or rotate with respect to external device 98.

In practice, wireless communications system 95 and/or external device 98 will move and/or rotate frequently over time. Wireless communications system 95 may not have knowledge at any given moment of the precise orientation and position of external device 98 with respect to wireless communications system 95. Similarly, external device 98 may not have knowledge at any given moment of the precise orientation and position of wireless communications system 95. As such, if care is not taken, it can be difficult for external device 98 to demodulate the different wireless data streams in THF signals 32H and 32V properly and coherently (e.g., due to the misalignment and/or changing alignment between wireless communications system 95 and external device 98).

In addition, polarization dispersion in the optical fibers of wireless communications system 95 (e.g., optical path 92) and radio-frequency transmission/polarization impairments (e.g., in access point 45) can further limit the ability of external device 98 to coherently demodulate the different wireless data streams in THF signals 32H and 32V. To mitigate these issues, wireless communications system 95 and external device 98 may use THF signals 32H and 32V to estimate and mitigate the misalignment between external device 98 and wireless communications system 95 and to mitigate transmission impairments within wireless communications system 95.

To further illustrate the transmission impairments within wireless communications system 95, consider a system model for the most dominant error signals in a dual-polarization coherent optical fiber system. In this model, the transmission impairments generally include chromatic dispersion (CD) and polarization effects such as polarization-mode dispersion (PMD). PMD is modeled as polarization rotation, represented by a unitary matrix and differential group delay (DGD) between the orthogonal polarization tributaries. Amplified spontaneous emission (ASE) from erbium-doped fiber amplifiers may be modeled as additive white Gaussian noise (AWGN) for the optical field. Non-linear distortions induced through transmission over the optical fiber and transmit (TX) in-phase quadrature-phase (I/Q) imbalance are disregarded. The transmitted signal of each polarization is multiplexed and transmitted over the optical fiber (e.g., optical path 92). The optical linear field impairments can be modeled using equation 1.

$$H(\omega) = J \cdot D(\omega) \cdot C(z, \omega) \quad (1)$$

In equation 1, $\omega$ is angular frequency, z is propagation distance, J is a Jones matrix representation of a random polarization rotation with random phase shifts between transmit and receiver axes (e.g., as given by equation 2), $D(\omega)$ is a matrix that represents the PMD-induced differential group delay between both polarization waves, whose values generally range between 1 and 100 ps (e.g., as given by equation 3), and $C(z,\omega)$ corresponds to the frequency response of chromatic dispersion (e.g., as given by equation 4).

$$J = \begin{pmatrix} \cos\alpha & e^{-j\theta}\sin\alpha \\ -e^{-j\theta}\sin\alpha & \cos\alpha \end{pmatrix} \quad (2)$$

In equation 2, $\alpha$ is the azimuth rotation angle and $\theta$ is the elevation rotation angle that can make the signal state of polarization sweep over the entire Poincaré sphere, and j is the square root of negative one.

$$D(\omega) = \begin{pmatrix} e^{j\omega\tau/2} & 0 \\ 0 & e^{-j\omega\tau/2} \end{pmatrix} \quad (2)$$

$$C(\omega) = e^{\frac{-j\lambda^2 Dz}{4\pi c}\omega^2} \quad (4)$$

In equation 4, $\lambda$ is the central wavelength of the transmitted optical wave, c is the speed of light in a vacuum, and D is the fiber chromatic dispersion coefficient. Polarization dependent loss (PDL) is omitted from the model.

Additional transmission impairments are also considered, as the fiber-impaired signal is directly transferred to THF and experiences additional radio transmission impairments. Such impairments include misalignment (rotation) between wireless communications system 95 and external device 98. Assuming a simplest case that only accounts for line of sign (LOS) between wireless communications system 95 and external device 98, rotation of external device 98 (e.g., the mobile receiver) is considered in the polarization plane. In the model, the transmit polarization direction and the receiver polarization direction are each projected onto a projection plane. In the projection plane, the projected receiver polarization direction is oriented at a rotation angle $\alpha$ with respect to a vector in the projection plane that is orthogonal to the transmit polarization direction as projected into the projection plane (assuming that the transmitter and the receiver are arranged on the optical axis so the electric field is perpendicular to the axis). This results in a Jones matrix $M(\vartheta)$ as given by equation 5.

$$M(\vartheta) = \begin{pmatrix} \cos\vartheta & \sin\vartheta \\ -\sin\vartheta & \cos\vartheta \end{pmatrix} \quad (5)$$

Transmission impairments associated with UTC PD 42 and the antennas that convey THF signals 32H and 32V are generally on the order of −20 dB from one polarization to another. As such, these impairments can be omitted from the model. Given each of these impairments, optical fiber and THF polarization impairments can be modeled/represented more simply using the matrix H(ω) given by equation 6, which characterizes the overall impairment response associated with transmission of THF signals 32H and 32V by wireless communications system 95 to external device 98 (e.g., taking into account impairments in the optical domain at wireless communications system 95, in the THF domain at wireless communications system 95, and in the THF domain as given by the rotation/misalignment of wireless communications system 95 with respect to external device 98).

$$H(\omega) = J \cdot D(\omega) \cdot C(z, \omega) \cdot M(\vartheta) \qquad (6)$$

Figure 9:
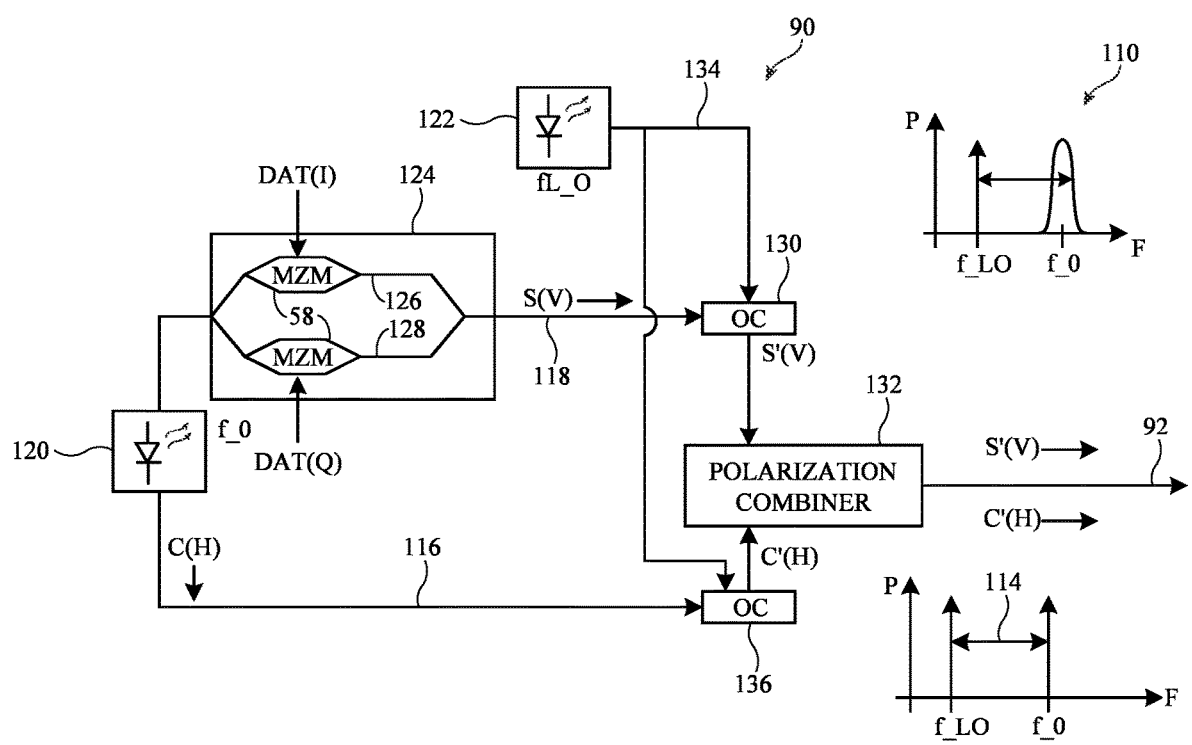
FIG. 9 is a circuit diagram showing how an illustrative central optical controller may generate optical signals that are provided to an access point for conveying multiple polarizations of wireless signals at frequencies greater than about 100 GHz in accordance with some embodiments.

The transmitting device (e.g., wireless communications system 95) and the receiving device (e.g., external device 98) may be configured to mitigate these transmission impairments to maximize the communications efficiency of the system. FIG. 9 is a circuit diagram showing one example of how central optical controller 90 of FIG. 8 may transmit optical signals to access point 45.

As shown in FIG. 9, central optical controller 90 may include LO light sources such as light sources 120 and 122 (e.g., light sources such as light sources 70 of FIG. 6 or light sources 70A and 70B of FIG. 7). Light sources 120 and 122 may include light-emitting diodes or laser light sources, as examples. Light source 120 may be coupled to a first optical combiner (OC) 130 over optical path 118 (e.g., one or more optical fibers, waveguides, etc.). Light source 120 may also be coupled to a second optical combiner (OC) 136 over optical path 116 (e.g., one or more optical fibers, waveguides, etc.). Light source 122 may also be coupled to optical combiners 130 and 136 over optical path 134 (e.g., one or more optical fibers, waveguides, etc.).

Central optical controller 90 may include an optical modulator such as optical modulator 124 interposed along optical path 118. Optical modulator 124 may, for example, include a first optical branch 126 and a second optical branch 128 and may include MZMs 58 interposed on each optical branch. Optical modulator 124 may receive wireless data DAT for transmission. Wireless data DAT may include, for example, I/Q data (e.g., where in-phase data DAT(I) is provided to the MZM 58 on optical branch 126 and quadrature-phase data DAT(Q) is provided to the MZM 58 on optical branch 128). The output of optical combiners 130 and 136 may be coupled to the input of polarization combiner 132. The output of polarization combiner 132 may be coupled to optical path 92.

During wireless transmission, light source 120 may emit light (e.g., LO signals) on optical paths 118 and 116 at an optical frequency such as frequency f_0. Optical structures in central optical controller 90 may configure the light at frequency f_0 emitted onto optical path 118 to exhibit a first polarization (e.g., a vertical linear polarization V) and may configure the light at frequency f_0 emitted onto optical path 116 to exhibit a second polarization that is different from (e.g., orthogonal to) the first polarization (e.g., a horizontal linear polarization H).

Central optical controller 90 may use optical modulator 124 to modulate a signal (e.g., wireless data DAT) onto the vertically polarized light at frequency f_0 emitted onto optical path 118 by light source 120 to produce (generate) a vertically (V) polarized modulated signal such as modulated signal S(V) (e.g., a modulated signal on a carrier at frequency f_0). The light emitted onto optical path 116 is un-modulated and is therefore referred to herein as a horizontally (H) polarized unmodulated carrier C(H). At the same time, light source 122 may emit an optical local oscillator signal at frequency f_LO onto optical path 134.

Optical combiner 130 may combine the optical local oscillator signal at frequency f_LO with modulated signal S(V) to produce vertically polarized combined signal S'(V) (e.g., a dual tone signal pair where one tone is modulated with wireless data DAT). Graph 110 of FIG. 9 plots vertically polarized combined signal S'(V) in power (P) as a function of frequency (F). As shown by graph 110, vertically polarized combined signal S'(V) includes an unmodulated spectral line (peak) at frequency f_LO (e.g., from the optical local oscillator signal emitted by light source 122) and a modulated signal (e.g., as produced by optical modulator 124) on a carrier at frequency f_0 (e.g., as produced by light source 120). Frequency f_LO is separated from frequency f_0 by frequency gap 114. Frequency gap 114 corresponds to the frequency of the wireless signals conveyed by access point 45 (FIG. 8) using vertically polarized combined signal S'(V). Frequency gap 114 may be, for example 25-1000 GHz.

Similarly, optical combiner 136 may combine the optical local oscillator at frequency f_LO with unmodulated carrier C(H) to produce horizontally polarized combined signal C'(H) (e.g., a dual tone signal pair where both tones are unmodulated). Graph 112 of FIG. 9 plots horizontally polarized combined signal C'(H). As shown by graph 112, horizontally polarized combined signal C'(H) includes a first unmodulated spectral line (peak) at frequency f_LO (e.g., from the optical local oscillator signal emitted by light source 122) and a second unmodulated spectral line (peak) at frequency f_0 (e.g., as produced by light source 120). Polarization combiner 132 may combine the optical signals of each polarization (e.g., may combine the vertically polarized combined signal S'(V) and the horizontally polarized combined signal C'(H)) and may output the optical signals on optical path 92.

Access point 45 (FIG. 8) may receive combined signals S'(V) and C'(H) over optical path 92. Access point 45 may include a polarization splitter that separates combined signal S'(V) from combined signal C'(H). Access point 45 may include a first UTC PD 42 coupled to antenna 30V in dual-polarization antenna 94 (FIG. 8) that is illuminated using combined signal S'(V) to cause antenna 30V to convey vertically polarized THF signals (e.g., THF signals 32V of FIG. 8). Access point 45 may include a second UTC PD 42 coupled to antenna 30H in dual-polarization antenna 94 (FIG. 8) that is illuminated using combined signal C'(H) to cause antenna 30H to convey horizontally polarized THF signals (e.g., THF signals 32H of FIG. 8). If desired, access point 45 may include multiple dual-polarization antennas 94 (e.g., in a phased antenna array as shown in FIG. 7) to convey THF signals 32H and 32V in signal beams oriented in a selected beam pointing direction. The example of FIG. 9 is merely illustrative. If desired, central optical controller 90 may use other transmit signal definitions to produce optical signals for controlling antennas 30V and 30H in access point 45 to convey THF signals of any desired polarizations.

Figure 10:
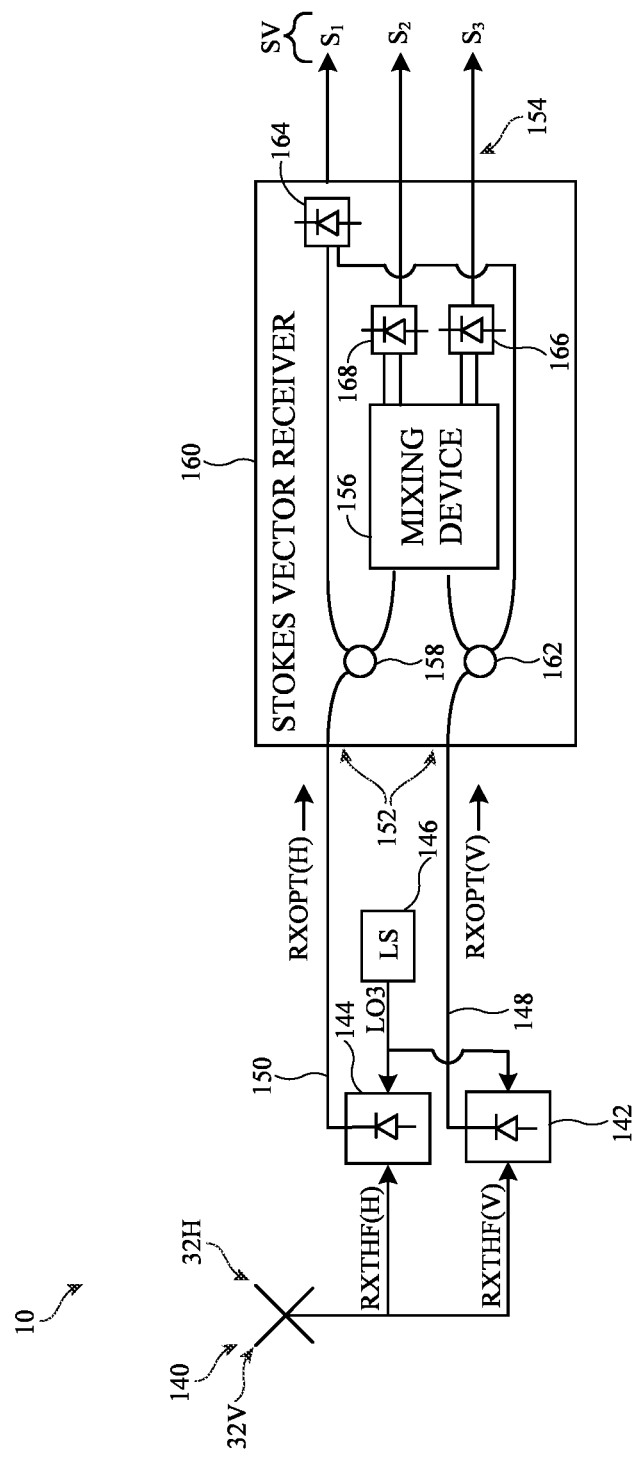
FIG. 10 is a circuit diagram of an illustrative electronic device having a Stokes vector receiver for receiving multiple polarizations of wireless signals at frequencies greater than about 100 GHz in accordance with some embodiments.

FIG. 10 is a circuit diagram showing one example of how external device 98 of FIG. 8 may receive and process the THF signals 32V and 32H transmitted by wireless communications system 95 (e.g., while mitigating transmission impairments associated with communicating using THF signals of different polarizations). In the example of FIG. 10, external device 98 is an electronic device such as device 10.

As shown in FIG. 10, device 10 may include a dual-polarization antenna such as dual-polarization antenna 140. While only a single dual-polarization antenna 140 is illustrated in FIG. 10 for the sake of clarity, device 10 may include a phased antenna array of dual-polarization antennas 140 if desired. Dual-polarization antenna 140 may include antenna 32V for conveying vertically polarized THF signals and antenna 32H for conveying horizontally polarized THF signals. This is merely illustrative and, in general, dual-polarization antenna 140 may convey THF signals with any desired polarizations.

Dual-polarization antenna 140 may be coupled to a first photodiode such as photodiode 144 and to a second photodiode such as photodiode 142 (e.g., UTC photodiodes such as UTC photodiode 42 of FIG. 6). Device 10 may include a light source 146 (e.g., a light source in light sources 70 of FIG. 6) that illuminates photodiodes 142 and 144 using optical local oscillator signal LO3. Light source 146 may include, for example, a vertical cavity surface emitting laser (VCSEL). Optical local oscillator signal LO3 may be at a carrier frequency of combined signals S'(V) and C'(H) and thus THF signals 32H/32V (e.g., frequency f_0 of light source 120 in central optical controller 90 of FIG. 9).

Antenna 32V may receive THF signals 32V from wireless communications system 95 (FIG. 8) as vertically polarized receive signals RXTHF(V) (e.g., at a frequency equal to frequency gap 114 of FIG. 9). Antenna 32V may pass vertically polarized receive signals RXTHF(V) to photodiode 142. If desired, one or more amplifiers (e.g., low noise amplifiers) may amplify vertically polarized receive signals RXTHF(V) prior to transmission to photodiode 144. Similarly, antenna 32H may receive THF signals 32H from wireless communications system 95 as horizontally polarized receive signals RXTHF(H) (e.g., at a frequency equal to frequency gap 114 of FIG. 9). Antenna 32H may pass horizontally polarized receive signals RXTHF(H) to photodiode 144. If desired, one or more amplifiers (e.g., low noise amplifiers) may amplify horizontally polarized receive signals RXTHF(H) prior to transmission to photodiode 142.

Photodiode 144 may use optical local oscillator signal LO3 to upconvert horizontally polarized receive signals RXTHF(H) to an optical frequency as horizontally polarized optical signals RXOPT(H). Similarly, photodiode 142 may use optical local oscillator signal LO3 to upconvert vertically polarized receive signals RXTHF(V) to an optical frequency as vertically polarized optical signals RXOPT(V). In other words, photodiodes 144 and 142 may convert the received signals from the THF domain to the optical domain.

As shown in FIG. 10, the transceiver circuitry in device 10 may include a Stokes vector receiver such as Stokes vector receiver (SVR) 160. SVR 160 may have two or more input ports (terminals) such as input ports 152. SVR 160 may also have three or more output ports (terminals) such as output ports 154. A first input port 152 of SVR 160 may be coupled to photodiode 144 over optical path 150 (e.g., one or more optical fibers and/or waveguides). A second input port 152 of SVR 160 may be coupled to photodiode 142 over optical path 148 (e.g., one or more optical fibers and/or waveguides). Photodiode 144 may emit horizontally polarized optical signals RXOPT(H) on optical path 150 and SVR 160 may receive horizontally polarized optical signals RXOPT(H) over its first input port 152. Photodiode 142 may emit vertically polarized optical signals RXOPT(V) on optical path 148 and SVR 160 may receive vertically polarized optical signals RXOPT(V) over its second input port 152.

SVR 160 may include a first optical coupler such as optical coupler 158 and a second optical coupler such as optical coupler 162 (e.g., optical splitters and optionally optical combiners). Optical coupler 158 may be coupled to the first input port 152. Optical coupler 162 may be coupled to the second input port 152. SVR 160 may also include a downconverting mixing device such as mixing device 156. Mixing device 156 may be, for example, a 90-degree optical hybrid mixing device such as a photonic homodyne receiver (e.g., a direct conversion homodyne mixing device).

SVR 160 may include a set of photodetectors (e.g., balanced photodetectors) such as photodiodes 164, 166, and 168. Photodiode 164 may be optically coupled to optical coupler 158 and optical coupler 162. Photodiode 168 may be optically coupled to the output of mixing device 156. Photodiode 166 may be optically coupled to the output of mixing device 166. Photodiodes 164, 166, and 168 may also be coupled to respective output ports 154 of SVR 160. Mixing device 156 may have inputs coupled to optical couplers 158 and 162.

During signal reception, optical coupler 158 may provide horizontally polarized optical signal RXOPT(H) to photodiode 164 and the input of mixing device 156. Optical coupler 162 may provide vertically polarized optical signal RXOPT(V) to photodiode 164 and the input of mixing device 156. Mixing device 156 may perform homodyne mixing on horizontally polarized optical signal RXOPT(H) and vertically polarized optical signal RXOPT(V) that downconverts the signals and may provide (output) optical signals to photodiodes 166 and 168.

SVR 160 may output a Stokes vector SV on output ports 154. Each output port 154 may output a respective vector element from Stokes vector SV. For example, photodiode 164 may be illuminated using vertically polarized optical signal RXOPT(V) and horizontally polarized optical signal RXOPT(H) to produce vector element $S_1$ of stokes vector SV on a first output port 154 of SVR 160. Similarly, photodiode 168 may be illuminated using first outputs of mixing device 156 to produce vector element $S_2$ of stokes vector SV on a second output port 154 of SVR 160 and photodiode 166 may be illuminated using second outputs of mixing device 156 to produce vector element $S_3$ of Stokes vector SV on a third output port 154 of SVR 160. In other words, Stokes vector SV may be represented by the vector $[S_1, S_2, S_3]^T$, where T is the transpose operator. This example is merely illustrative. Stokes vector SV may have more than three elements (e.g., four elements) and SVR 160 may have more than three output ports 154 (e.g., four output ports). Stokes vector SV may include single-ended or differential signals. Other SVR architectures may be used if desired.

The THF signals 32H and 32V received at device 10 may be expressed by a Jones vector $J=[S, C]^T$, where S is the modulated signal from vertically polarized combined signal S'(V) and C is the unmodulated carrier from horizontally polarized combined signal C'(H) (FIG. 9). Assuming no polarization rotation (e.g., perfect alignment) between wireless communications system 95 and device 10 of FIG. 10, the Jones vector would appear like the ideal Stokes Vector SV when output by SVR 160. In other words, in the absence of polarization rotation, SVR 160 may output a Stokes vector SV as given by equation 7.

$$SV=[S_1,S_2,S_3]^T=[|S|^2-|C|^2 \operatorname{Re}(S \cdot C^*)] \quad (7)$$

In equation 7, Re( ) is a real number operator that outputs the real component of its argument and Im( ) is an imaginary number operator that outputs the imaginary component of its argument. In other words, in this ideal case, photodiode 164 in SVR 160 may output $S_1$ as $|S|^2-|C|^2$, photodiode 168 in SVR 160 may output $S_2$ as Re(S·C*), and photodiode 166 in SVR 160 may output $S_3$ as Im(S·C*).

However, in practice, there is non-zero polarization rotation between wireless communications system 95 and device 10 (e.g., device 10 and wireless communications system 95 are imperfectly aligned) and such rotation may change as wireless communications system 95 and/or device 10 moves or changes orientation. As such, control circuitry 14 (FIG. 1) may measure (e.g., identify, detect, gather, generate, estimate, etc.) Stokes vector SV using SVR 160, may identify (e.g., detect, generate, estimate, etc.) the polarization rotation between device 10 and wireless communications system 95 using the measured Stokes vector SV, and may actively compensate for the identified polarization rotation during the reception of subsequent THF signals from wireless communications system 95.

Since the non-ideal signal polarization is randomly rotated in the optical fiber and wireless channels, the received optical signals RXOPT(H) and RXOPT(V) will each be an arbitrary/random mixture of the transmitted modulated signal S and the transmitted unmodulated carrier C. SVR 160 may be used to acquire the polarization rotation (PR) between device 10 and wireless communications system 95. Unlike coherent detection, which performs PR in the Jones space, SVR 160 performs PR detection in the Stokes space. The Stokes space may be depicted by a Poincaré sphere having a random rotation of the V and H polarization planes because of fiber and wireless polarization transmission. Control circuitry 14 may identify these planes and may de-rotate the planes to align the V and H polarization planes with the $S_2$ and $S_3$ planes, respectively, in the Poincaré sphere. To recover the received signal, control circuitry 14 may identify (e.g., detect, generate, estimate, etc.) an SV rotation matrix X of the combined channel and may use the SV rotation matrix X to rotate the stokes vector SV for subsequently-received signals to align with those at the transmitter (wireless communications system 95).

Figure 11:
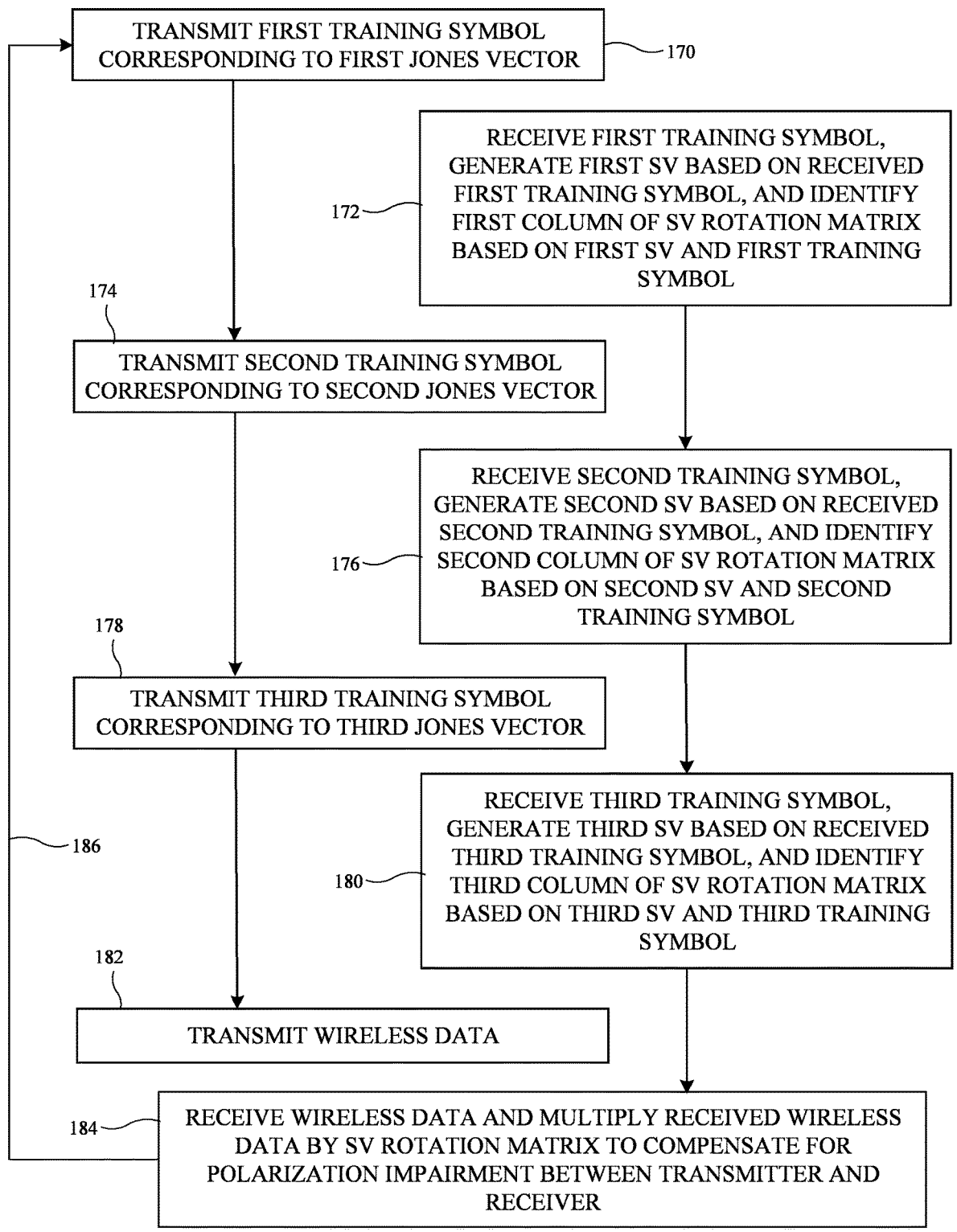
FIG. 11 is a flow chart of illustrative steps that may be performed by a transmitting device and a receiving device for mitigating transmission impairments associated with the transmission of multiple polarizations of wireless signals at frequencies greater than about 100 GHz in accordance with some embodiments.

If desired, wireless communications system 95 may transmit test data that allows device 10 to identify rotation matrix X at any given instant. FIG. 11 is a flow chart of illustrative operations involved in controlling wireless communications system 95 and device 10 to identify rotation matrix X for use in performing subsequent communications while mitigating polarization rotations and other impairments between device 10 and wireless communications system 95. Operations 172, 176, 180, and 184 of FIG. 11 may be performed by device 10 of FIG. 10 (e.g., a first device 10). Operations 170, 174, 178, and 182 of FIG. 11 may be performed by wireless communications system 95 of FIG. 9 (e.g., at least a second device 10). The test data transmitted by wireless communications system 95 may include a series of test data such as a series of training symbols. The training symbols may, for example, be added before each transmit signal frame in the time domain.

At operation 170, wireless communications system 95 may transmit vertically polarized combined signal S'(V) and horizontally polarized combined signal C'(H) (FIG. 9), where vertically polarized combined signal S'(V) includes a first training (test) symbol from a series of training (test) symbols. The training symbol may include a predetermined pattern or series of bits that are known to both device 10 and wireless communications system 95. Wireless communications system 95 may, for example, append the first training symbol to the beginning of a first signal frame in the time domain. The first training symbol may, for example, involve the transmission of no modulated signals, thereby resulting in a Jones vector of [0, 1]. This may correspond to an expected Stokes vector SVE at device 10 of $[-1,0,0]^T$, which is predetermined and known to device 10 (e.g., which is expected by device 10 during the scheduled transmission of the first training symbol). Equation 8 characterizes the Stokes vector SV measured by SVR 160 on device 10 in response to the first training symbol.

$$SV = X \cdot SVE \tag{8}$$

Equation 9 expands the vectors and matrices of Equation 7 to show each element S of the Stokes vector SV measured using SVR 160 on device 10, each element x of SV rotation matrix X, and each element of the expected Stokes vector SVE for the first training symbol.

$$\begin{pmatrix} S_1 \\ S_2 \\ S_3 \end{pmatrix} = \begin{pmatrix} x_{11} & x_{12} & x_{13} \\ x_{21} & x_{22} & x_{23} \\ x_{31} & x_{32} & x_{33} \end{pmatrix} \begin{pmatrix} -1 \\ 0 \\ 0 \end{pmatrix} \tag{9}$$

At operation 172, device 10 may receive the first training symbol transmitted by wireless communications system 95 and may provide the corresponding optical signals RXOPT(H) and RXOPT(V) to SVR 160. SVR 160 may generate Stokes vector SV based on the received first training symbol. As shown by equation 9, the first training symbol will cause the multiplication of SV rotation matrix X and expected Stokes vector $[-1,0,0]^T$ to preserve only the first column of SV rotation matrix X (e.g., $[x_{11}, x_{21}, x_{31}]^T$) while the remaining columns are equal to zero. As such, control circuitry 14 on device 10 may identify (e.g., measure, detect, determine, generate, etc.) the first column of SV rotation matrix X by using SVR 160 to generate Stokes vector SV in response to the first training symbol received in optical signals RXOPT(H) and RXOPT(V) (e.g., where the element $S_1$ output by photodiode 164 is equal to $-x_{11}$, the element $S_2$ output by photodiode 168 is equal to $-x_{21}$, and the element $S_3$ output by photodiode 166 is equal to $-x_{31}$). Subsequent training symbols may be used to identify the remaining columns of SV rotation matrix X.

At operation 174, wireless communications system 95 may transmit vertically polarized combined signal S'(V) and horizontally polarized combined signal C'(H) (FIG. 9), where vertically polarized combined signal S'(V) includes a second training (test) symbol from the series of training (test) symbols. The power of horizontally polarized combined signal C'(H) may remain constant for the first and second training symbols. Wireless communications system 95 may, for example, append the second training symbol to the beginning of a second signal frame in the time domain. The second training symbol may, for example, involve the transmission of a real signal with a constant power that is the same as that of the carrier, thereby resulting in a Jones vector of [1, 1]. This may correspond to an expected Stokes vector SVE at device 10 of $[0,1,0]^T$, which is predetermined and known to device 10 (e.g., which is expected by device 10 during the scheduled transmission of the second training symbol). Equation 10 characterizes the Stokes vector SV measured by SVR 160 on device 10 in response to the second training symbol.

$$\begin{pmatrix} S_1 \\ S_2 \\ S_3 \end{pmatrix} = \begin{pmatrix} x_{11} & x_{12} & x_{13} \\ x_{21} & x_{22} & x_{23} \\ x_{31} & x_{32} & x_{33} \end{pmatrix} \begin{pmatrix} 0 \\ 1 \\ 0 \end{pmatrix} \tag{10}$$

At operation 176, device 10 may receive the second training symbol transmitted by wireless communications system 95 and may provide the corresponding optical signals RXOPT(H) and RXOPT(V) to SVR 160. SVR 160 may generate Stokes vector SV based on the received second training symbol. As shown by equation 10, the second training symbol will cause the multiplication of SV rotation matrix X and expected Stokes vector $[0,1,0]^T$ to preserve only the second column of SV rotation matrix X (e.g., $[x_{12}, x_{22}, x_{32}]^T$) while the remaining columns are equal to zero. As such, control circuitry 14 on device 10 may identify (e.g., measure, detect, determine, generate, etc.) the second column of SV rotation matrix X by using SVR 160 to generate Stokes vector SV in response to the second training symbol received in optical signals RXOPT(H) and RXOPT(V) (e.g., where the element $S_1$ output by photodiode 164 is equal to $x_{12}$, the element $S_2$ output by photodiode 168 is equal to $x_{22}$, and the element $S_3$ output by photodiode 166 is equal to $x_{32}$).

At operation 178, wireless communications system 95 may transmit vertically polarized combined signal S'(V) and horizontally polarized combined signal C'(H) (FIG. 9), where vertically polarized combined signal S'(V) includes a third training (test) symbol from the series of training (test) symbols. The power of horizontally polarized combined signal C'(H) may remain constant between the first, second, and third training symbols. Wireless communications system 95 may, for example, append the third training symbol to the beginning of a third signal frame in the time domain. The third training symbol may, for example, be represented by a Jones vector of [j, 1]. This may correspond to an expected Stokes vector SVE at device 10 of $[0,0,1]^T$, which is predetermined and known to device 10 (e.g., which is expected by device 10 during the scheduled transmission of the second training symbol). Equation 11 characterizes the Stokes vector SV measured by SVR 160 on device 10 in response to the third training symbol.

$$\begin{pmatrix} S_1 \\ S_2 \\ S_3 \end{pmatrix} = \begin{pmatrix} x_{11} & x_{12} & x_{13} \\ x_{21} & x_{22} & x_{23} \\ x_{31} & x_{32} & x_{33} \end{pmatrix} \begin{pmatrix} 0 \\ 0 \\ 1 \end{pmatrix} \quad (11)$$

At operation 180, device 10 may receive the third training symbol transmitted by wireless communications system 95 and may provide the corresponding optical signals RXOPT(H) and RXOPT(V) to SVR 160. SVR 160 may generate Stokes vector SV based on the received third training symbol. As shown by equation 11, the third training symbol will cause the multiplication of SV rotation matrix X and expected Stokes vector $[0,1,0]^T$ to preserve only the third column of SV rotation matrix X (e.g., $[x_{13}, x_{23}, x_{33}]^T$) while the remaining columns are equal to zero. As such, control circuitry 14 on device 10 may identify (e.g., measure, detect, determine, generate, etc.) the third column of SV rotation matrix X by using SVR 160 to generate Stokes vector SV in response to the third training symbol received in optical signals RXOPT(H) and RXOPT(V) (e.g., where the element $S_1$ output by photodiode 164 is equal to $x_{13}$, the element $S_2$ output by photodiode 168 is equal to $x_{23}$, and the element $S_3$ output by photodiode 166 is equal to $x_{33}$). In this way, device 10 may use the three training symbols to measure the elements in each column of SV rotation matrix X. Device 10 may thereafter have knowledge of the polarization rotation between device 10 and communications system 95.

At operation 182, wireless communications system 95 may continue to transmit wireless data to device 10 using THF signals 32H and 32V (e.g., using vertically polarized combined signal S'(V) and horizontally polarized combined signal C'(H) of FIG. 9).

At operation 184, device 10 may receive the transmitted wireless data. SVR 160 on device 10 may generate Stokes vector SV using the received wireless data and may multiply Stokes vector SV (e.g., the received wireless data) by the generated SV rotation matrix X to reverse, mitigate, or compensate for the polarization rotation between device 10 and wireless communications system 95 and other related optical/wireless impairments. Multiplication of the measured Stokes vector SV by SV rotation matrix X may, for example, recover the transmitted Stokes vector SV as $[|S|^2-|C|^2, Re(S \cdot C^*), Im(S \cdot C^*)]$, thereby allowing device 10 to properly receive the transmitted wireless data while optimizing communications efficiency. In other words, by combining the second and third elements of the measured Stokes vector SV, control circuitry 14 on device 10 may recover a final output that has the full phase diversity of modulated signal S, from which the input signal is fully recovered without being affected by chromatic dispersion-related fading. The nonlinearity term is grouped into the first element (component) of the measured Stokes vector SV without affecting the recovered signals derived from the second and third elements (components) of the measured Stokes vector SV.

Processing may subsequently loop back to operation 170 via path 186 to update the rotation matrix X over time (e.g., after a predetermined time period has elapsed, at a scheduled time, in response to a user input or application call, in response to the sensed movement and/or rotation of device 10, etc.). The example of FIG. 11 is merely illustrative. If desired, device 10 may transmit the identified SV rotation matrix X to wireless communications system 95 (e.g., at operation 180) and wireless communications system 95 may pre-compensate subsequently transmitted wireless data for the polarization rotation using SV rotation matrix X (e.g., at operation 182). Other methods for detecting Stokes vector SV may be used if desired. These operations may be generalized to generate Stokes Vectors SV of any desired size and to recover the elements of an SV rotation matrix X of any desired size. If desired, other polarizations may be used for THF signal transmission. Other modulation formats may be used if desired.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users. The optical components described herein (e.g., MZM modulator(s), waveguide(s), phase shifter(s), UTC PD(s), etc.) may be implemented in plasmonics technology if desired.

The methods and operations described above in connection with FIGS. 1-13 (e.g., the operations of FIGS. 10 and 13) may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., storage circuitry 16 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., processing circuitry 18 of FIG. 1, etc.). The processing circuitry may include microprocessors, central processing units (CPUs), application-specific integrated circuits with processing circuitry, or other processing circuitry.

The foregoing is merely illustrative and various modifications can be made to the described embodiments. The foregoing embodiments may be implemented individually or in any combination.

What is claimed is:

1. An electronic device comprising:
  a first antenna radiating element configured to receive a first wireless signal of a first polarization;
  a first uni-travelling-carrier photodiode (UTC PD) coupled to the first antenna radiating element;
  a second antenna radiating element configured to receive a second wireless signal of a second polarization that is different from the first polarization;
  a second UTC PD coupled to the second antenna radiating element; and
  a receiver coupled to the first UTC PD over a first optical path and coupled to the second UTC PD over a second optical path.

2. The electronic device of claim 1, wherein the second antenna radiating element at least partially overlaps the first antenna radiating element, the first antenna radiating element comprises a first planar dipole element, and the second antenna radiating element comprises a second planar dipole element oriented orthogonal to the first planar dipole element.

3. The electronic device of claim 1, wherein the first polarization is orthogonal to the second polarization.

4. The electronic device of claim 1, wherein the receiver comprises a Stokes vector receiver configured to receive a first optical signal over the first optical path and configured to receive a second optical signal over the second optical path.

5. The electronic device of claim 4, wherein the Stokes vector receiver comprises:
  a first optical coupler coupled to the first optical path;
  a second optical coupler coupled to the second optical path;
  a first photodiode coupled to the first optical coupler and the second optical coupler;
  a second photodiode;
  a third photodiode; and
  a mixing device coupled to the first optical coupler, the second optical coupler, the first photodiode, the second photodiode, and the third photodiode.

6. The electronic device of claim 5, wherein the first photodiode is configured to generate a first element of a Stokes vector based on the first and second optical signals, the second photodiode is configured to generate a second element of the Stokes vector based on first outputs of the mixing device, and the third photodiode is configured to generate a third element of the Stokes vector based on second outputs of the mixing device.

7. The electronic device of claim 4, wherein the Stokes vector receiver is configured to generate a Stokes vector based on the first optical signal and the second optical signal, the electronic device further comprising:
  one or more processors configured to mitigate a polarization rotation between the electronic device and a transmitting device based at least in part on the Stokes vector.

8. The electronic device of claim 1, further comprising:
  a light source configured to emit an optical local oscillator (LO) signal, wherein the first UTC PD is configured to convert the first wireless signal using the optical LO signal and the second UTC PD is configured to convert the second wireless signal using the optical LO signal.

9. The electronic device of claim 8, wherein the light source comprises a vertical cavity surface emitting laser (VCSEL).

10. The electronic device of claim 1, wherein the receiver comprises:
  a first optical coupler having an input coupled to the first optical path; and
  a second optical coupler having an input coupled to the second optical path.

11. The electronic device of claim 10, further comprising:
  a mixing device having a first input coupled to a first output of the first optical coupler and having a second input coupled to a first output of the second optical coupler.

12. The electronic device of claim 11, further comprising:
  a first photodiode having a first input coupled to a second output of the first optical coupler and having a second input coupled to a second output of the second optical coupler.

13. The electronic device of claim 12, further comprising:
  a second photodiode; and
  a third photodiode, the second photodiode and the third photodiode having inputs coupled to outputs of the mixing device.

14. The electronic device of claim 13, wherein the first photodiode, the second photodiode, and the third photodiode are configured to output respective elements of a Stokes vector.

15. The electronic device of claim 11, wherein the mixing device comprises a photonic homodyne receiver.

16. The electronic device of claim 10, further comprising:
  a photodiode having a first input coupled to an output of the first optical coupler and having a second input coupled to an output of the second optical coupler.

17. The electronic device of claim 1, wherein the first wireless signal and the second wireless signal are at one or more frequencies greater than or equal to 100 GHz.

18. Wireless circuitry comprising:
  a first antenna radiating element configured to receive a first wireless signal of a first polarization;
  a first uni-travelling-carrier photodiode (UTC PD) coupled to the first antenna radiating element;
  a second antenna radiating element configured to receive a second wireless signal of a second polarization that is different from the first polarization;
  a second UTC PD coupled to the second antenna radiating element;
  a substrate; and
  a receiver on the substrate, wherein the receiver is coupled to the first UTC PD over a first optical path and is coupled to the second UTC PD over a second optical path.

19. The wireless circuitry of claim 18, wherein the receiver comprises a Stokes vector receiver.

20. A method of operating an electronic device, the method comprising:
- receiving, using a first antenna radiating element and a first uni-travelling-carrier photodiode (UTC PD) coupled to the first antenna radiating element, a first wireless signal of a first polarization;
- receiving, using a second antenna radiating element and a second UTC PD coupled to the second antenna radiating element, a second wireless signal of a second polarization different from the first polarization;
- receiving, using a receiver, wireless data from the first wireless signal via a first optical path coupled to the first UTC PD; and
- receiving, using the receiver, wireless data from the second wireless signal via a second optical path coupled to the second UTC PD.

* * * * *